United States Patent
Glaser et al.

(10) Patent No.: US 10,367,350 B2
(45) Date of Patent: Jul. 30, 2019

(54) CENTRAL COMBINED ACTIVE ESD CLAMP

(71) Applicant: Infineon Technologies AG, Neubiberg (DE)

(72) Inventors: Ulrich Glaser, Putzbrunn (DE); Dragos Panaite, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 391 days.

(21) Appl. No.: 15/199,379

(22) Filed: Jun. 30, 2016

(65) Prior Publication Data

US 2018/0006448 A1    Jan. 4, 2018

(51) Int. Cl.
  *H02H 9/04*        (2006.01)
(52) U.S. Cl.
  CPC .................................. *H02H 9/046* (2013.01)
(58) Field of Classification Search
  CPC ..................................................... H02H 9/046
  USPC ........................................................... 361/56
  See application file for complete search history.

(56) References Cited

U.S. PATENT DOCUMENTS

| | | | |
|---|---|---|---|
| 5,654,862 A * | 8/1997 | Worley ............ | H03K 17/08104 361/111 |
| 5,889,644 A * | 3/1999 | Schoenfeld ......... | H01L 27/0255 361/111 |
| 5,889,664 A | 3/1999 | Oh | |
| 8,643,990 B2 | 2/2014 | Cao et al. | |
| 2011/0096446 A1 | 4/2011 | Croft | |
| 2011/0304940 A1 * | 12/2011 | Cao ........................ | H01L 23/60 361/56 |
| 2015/0124359 A1 | 5/2015 | Cao et al. | |
| 2015/0207313 A1 | 7/2015 | Rupp et al. | |
| 2017/0302066 A1 * | 10/2017 | Gao .................... | H01L 27/0255 |

FOREIGN PATENT DOCUMENTS

| | | |
|---|---|---|
| CN | 102064544 A | 5/2011 |
| CN | 104617569 A | 5/2015 |
| CN | 104810813 A | 7/2015 |
| DE | 102010030064 A1 | 12/2011 |

OTHER PUBLICATIONS

"ESDA/JEDEC Joint Standard for Electrostatic Discharge Sensitivity Testing—Human Body Model (HBM)—Component Level," ANSI/ANSI/ESDA/JEDEC, JS-001-2010, Apr. 20, 2010, 36 pp.
Office Action, in the Chinese language, from counterpart Chinese Application No. 201710506405.6, dated Feb. 19, 2019, 12 pp.

* cited by examiner

*Primary Examiner* — Kevin J Comber
(74) *Attorney, Agent, or Firm* — Shumaker & Sieffert, P.A.

(57) ABSTRACT

An electrostatic discharge clamp for groups of terminals having cascaded and different voltage classes, a plurality of discharge paths, and a multiple-input trigger circuit. In response to detecting a positive voltage event at any of the groups of terminals, the trigger circuitry can turn on an electronic switch causing current caused by the voltage event to flow through one or more of the discharge paths instead of through functional circuitry which could potentially be damaged by the current caused by the voltage event.

20 Claims, 6 Drawing Sheets

CENTRAL COMBINED ACTIVE ESD CLAMP

TECHNICAL FIELD

This disclosure relates to electronics and, more particularly, relates to electrostatic discharge protection circuitry.

BACKGROUND

An imbalance of electric charges within or on the surface of a material creates static electricity. This charge imbalance is most commonly observed as resulting from what is known as the triboelectric effect, also referred to as triboelectric charging. Tribolectric charging causes materials with weakly bound electrons to lose electrons through friction to materials with sparsely filled outer shells, resulting in one material becoming positively charged and the other negatively charged. Electrostatic discharge (ESD) is the sudden flow of electricity between two objects caused by contact. In everyday life, a common example of triboelectric charging occurs when someone walks across a floor creating a buildup of static electricity, and a common example of ESD occurs when that person touches a light switch or other conductive material, sometimes resulting in a small spark.

The spark created in the example above is typically harmless, and sometimes even imperceptible to human beings, but can potentially be very damaging to electronic devices and components. The example above of a person walking across a floor and touching a conductive material is just one of many examples of how static electricity can buildup and result in ESD that if brought into contact with electrical devices can potentially cause damage to the electrical device or electrical components within the device.

SUMMARY

This disclosure introduces an electrostatic discharge (ESD) monitoring and clamping circuit that may be incorporated into or otherwise electrically coupled to electronic circuitry and devices to provide ESD protection for the electronic circuitry or device. Examples described herein include a single ESD clamp, referred to in this disclosure as a "big switch," and a multiple-input trigger circuit to turn on the big switch to provide ESD protection for different stress combinations, i.e. different overvoltage conditions across different pin combinations. By using a big switch with the trigger circuit as described herein instead of multiple, separate ESD clamps, the techniques of this disclosure may allow for ESD protection circuitry that utilizes less area when implemented on an integrated circuit (IC) or when incorporated with electronic circuitry mounted to one or more printed circuit boards (PCBs), and that may also be simpler to implement when compared to prior art ESD clamps. In addition, the multiple-input trigger circuit disclosed herein allows groups of pins or terminals of an IC or of electrical circuitry that are directed to different voltage classes (groups of pins having an operating voltage and/or a maximum operating voltage that is different from the operating voltage range and/or maximum operating voltage of a different group of pins) to utilize the same trigger circuit and a single ESD clamp. Further, portions of the trigger circuit are reused on all of the multiple-inputs to the trigger circuit, thereby requiring a minimum number of additional components for each additional input to the trigger circuit, and thus utilizing a minimum additional circuit area for each of the additional inputs provided by the trigger circuit. Examples of the trigger circuit are configured to provide monitoring and overvoltage protection, including ESD created overvoltage conditions) of a group of pins operating within a same voltage class but not necessarily at the same voltages during normal operation using a single one of the multiple-inputs to the trigger circuit. Examples of the ESD monitoring and protection circuits are configured to provide ESD protection for the pins or terminals being monitored relative to both positive ESD stresses (positive ESD events) and negative ESD stresses (negative ESD events). Examples of the ESD path circuitry and the multiple-input trigger circuit disclosed herein utilize relatively small size components comparted to the size of the single device utilized as the big switch, and thus provide a relatively small overall circuit area compared to conventional ESD monitoring and clamping circuits.

In one example, a circuit comprises a trigger circuit comprising a first input, a second input, an anode, and a switched output, wherein the anode is configured to be coupled to a reference voltage, wherein the first input is configured to monitor a highest voltage level provided at a first group of terminals, the first group of terminals configured to operate within a first voltage class, wherein the second input is configured to monitor a highest voltage level provided at a second group of terminals, the second group of terminals configured to operate within a second voltage class that is different from the first voltage class, wherein a second maximum operating voltage for the second group of terminals is different than a first maximum operating voltage for the first group of terminals and wherein at least one of the first group of terminals or the second group of terminal comprises a plurality of terminals, and wherein the trigger circuit is configured to provide an output signal at the switched output when a positive electrostatic (ESD) event is occurring at either the first group of terminals or at the second group of terminals; and a single electronic switching device coupled to the switched output, the electronic switching device configured to receive the output signal, and to switch on and to clamp a voltage level occurring at the first group of terminals and at the second group of terminals relative to the reference voltage.

Another example comprises a method of providing overvoltage protection for an electronic circuit comprising: receiving at a first input of a trigger circuit a first highest voltage level provided by a first group of terminals, the first group of terminals operating in a first voltage class; receiving at a second input of the trigger circuit a second highest voltage level provided by a second group of terminals, the second group of terminals operating in a second voltage class that is different from the first voltage class; determining if the first highest voltage level exceeds a first trigger threshold voltage, and generating an output signal configured to turn on a semiconductor device to activate a path circuitry coupling the first group of terminals to a reference voltage to clamp the first highest voltage level relative to the reference voltage during a time when the first highest voltage level exceeds the first trigger threshold voltage; and determining if the second highest voltage level exceeds a second trigger threshold voltage, and generating the output signal configured to turn on the semiconductor device to activate the path circuitry coupling the second group of terminals to the reference voltage to clamp the second highest voltage level relative to the reference voltage during a time when the second highest voltage level exceeds the second trigger threshold voltage; wherein at least one of the first group of terminals or the second group of terminal includes a plurality of terminals.

In another example, a system comprises an electronic device comprising a first group of terminals and a second group of terminals, the first group of terminals configured to operate within a first voltage class, the second group of terminals configured to operate within a second voltage class having a different operating voltage range than an operating voltage range of the first voltage class; functional circuitry coupled to the first group of terminals and to the second group of terminals; a trigger circuit comprising a first input coupled to each terminal in the first group of terminals, each terminal in the first group of terminals coupled separately to the first input through a different forward biased diode, and a second input coupled to each terminal in the second group of terminals, each terminal in the second group of terminals coupled separately to the second input through another different forward biased diode, wherein the trigger circuit comprises a switched output and is configured to monitor a first voltage level at the first input and to provide an output signal at the switch output when the first voltage exceeds a first threshold trigger voltage, and to monitor the second voltage level at the second input and to provide an output signal at the switched output when the second voltage exceeds a second threshold trigger voltage; and a semiconductor device couple to the first group of terminals, to the second group of terminals, and to the switched output, the semiconductor device configured to receive the output signal from the trigger circuit and to turn on when receiving the output signal to clamp a voltage level at the first group of terminal and at the second group of terminals and to provide path circuitry through the semiconductor device to redirect current away from the functional circuitry.

The details of one or more examples are set forth in the accompanying drawings and the description below. Other features, objects, and advantages will be apparent from the description and drawings, and from the claims.

DESCRIPTION

Figure 1:
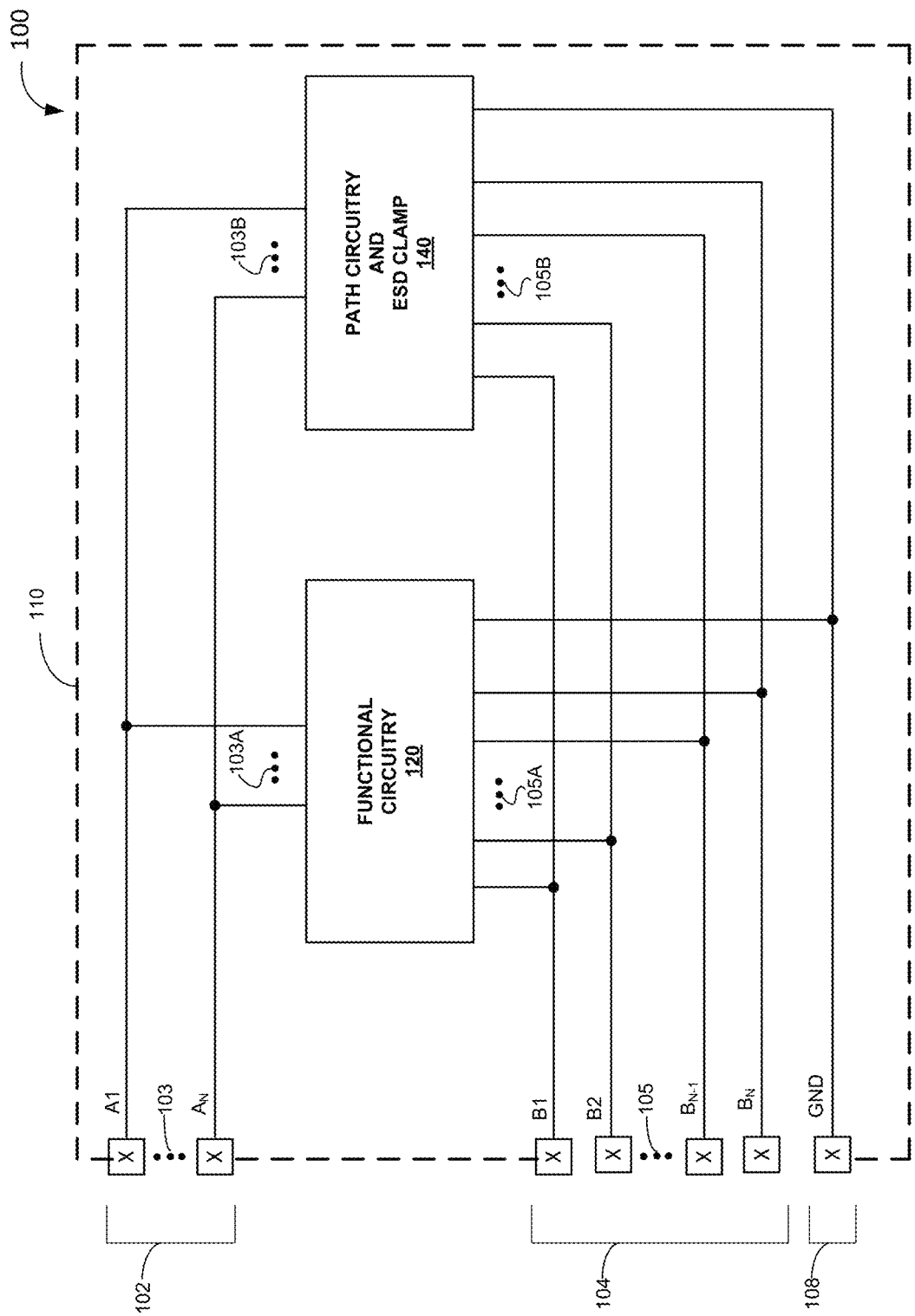
FIG. 1 illustrates a block diagram of a circuit including functional circuitry protected by path circuitry and an ESD active clamp circuit in accordance with one or more example implementations and techniques described in this disclosure.

To prevent damage caused by ESD, electronics manufacturers often incorporate ESD protection circuitry within electronic devices and components, such as integrated circuits (ICs) and with electronic devices provided on printed circuit boards (PCBs). An electronic device that includes a ground pin or terminal and groups of one or more pins or terminals that operate within different voltage classes (i.e., pins/terminals that provide different supply voltages levels and/or pins/terminals that operate over different ranges of voltages or have different maximum operating voltages), may include ESD protection circuitry to protect the functional circuits from ESD events occurring between the various pin/terminal combinations from both positive and negative ESD stresses. One type of ESD protection circuitry commonly used in electronic devices is an ESD clamp. Upon detecting an overvoltage or voltage spike across two pins of the device caused for example by an ESD event, the ESD clamp directs current caused by the overvoltage or voltage spike away from functional circuitry, using what may be referred to as "path circuitry" for example to a ground or reference voltage. While ESD protection circuitry adds to overall circuit complexity and requires physical space on the circuit, it may be necessary in some cases to protect the functional circuitry of the circuit. Without ESD protection circuitry, circuit reliability is potentially reduced, and the need for time consuming and costly circuit replacement is potentially increased.

This disclosure describes an electrostatic discharge (ESD) clamp that includes one big ESD switch, sometimes referred to in this disclosure as a big switch or simply as a "semiconductor device," and a multiple-input trigger circuit to turn on the big switch for different combinations of ESD induced stresses. Conventional electronic devices currently use multiple ESD clamps to provide protection to multiple voltage classes of pins on a device in order to protect all of the pins/terminals of the device against ESD events. This disclosure describes techniques for combining multiple ESD clamps into one ESD clamp including a big switch that can be controlled by a single multiple-input trigger circuit. By using a big switch with a single multiple-input trigger circuit instead of multiple, separate ESD clamps and separate trigger circuits for each ESD clamp, the devices and techniques of this disclosure may allow for ESD protection circuitry that utilizes less area when implemented on an integrated circuit (IC) or a printed circuit board (PCB) and that may also be simpler to implement when compared to prior art ESD clamps. This disclosure describes a trigger circuit wherein each one of the multiple-inputs to the trigger circuit is configured to monitor one or a plurality of pins operating in a common voltage class (i.e., a group of pins having a same operating voltage range and/or a same maximum operating voltage rating), and to provide ESD protection for all of the pins within that common voltage class using some portion of the single trigger circuit to control a single ESD clamping circuit, thus reducing the overall circuit complexity and the circuit area required to provide this protection. In addition, the ESD trigger circuit described herein utilizes a stacking technique that allows one or more additional portions of the trigger circuit configured to monitor one or more additional groups of pins belonging to different voltage classes to utilize portions of a same set of components within the trigger circuit, thereby further reducing the complexity and the amount of area required to implement these additional trigger circuits. The circuit design techniques introduced in this disclosure may be implemented into a wide array of highly integrated devices or ICs including microprocessors, microcontrollers, application-specific integrated circuits (ASICs), digital signal processors (DSPs), automotive ICs, security ICs, and power management ICs, and may also be implemented into non-highly integrated devices including PCBs. Circuits implementing the design techniques introduced in this disclosure may be included in consumer electronics, industrial electronics, automotive electronics, or virtually any other type of electronics devices where ESD protection is desired.

The ESD switch (big switch) used to implement the techniques of this disclosure is an electronic switch that may, for example, be a metal-oxide-semiconductor field-effect transistor (MOSFET) device, a bipolar transistor, a Gallium Nitride (GaN) FET, a thyristor, or some other type of electronic switch. Is some examples, the ESD switch is an n-channel double-diffused metal-oxide-semiconductor (DMOS) transistor. This disclosure will present several examples of ESD protection circuits that use a MOSFET switch, also referred to in this disclosure as the big switch or the "semiconductor device," but it should be understood that other types of switches, including those listed above, may similarly be used to implement the techniques of this disclosure. As used in this disclosure, the "big" in big switch generally refers to the overall area needed to implement the ESD protection. For example, certain components such as a forward diode or a trigger circuit, which may be used to implement the techniques of this disclosure and which will be described in more detail below, have about 10% the size of a big switch. A big switch may, for example, be between 5000 $\mu m^2$ and 100000 $\mu m^2$ depending on specified ESD requirements. In various examples, the big switch has a size of approximately 14000 $\mu m^2$. In various examples, other diodes disclosed herein, for example the forward biased diodes disclosed as path circuitry are much smaller in area than the big switch, for example ten of these diodes can be formed in an area of approximately 1200 $\mu m^2$. By requiring only one ESD clamping device (big switch) and utilizing relatively smaller components for the remainder of the ESD monitoring and protection circuits disclosed herein, the features and functions of the monitoring and protection circuits can be implemented utilizing a minimum amount of circuit area within a device or electronic component where these circuits are being employed.

In various illustrations and descriptions provided herein, reference is made to "ground" or to a voltage level as "ground". However, reference to "ground" or to a voltage level of "ground" is not limited to any particular voltage level, or to specifically meaning "earth ground," and is to be interpreted as referring to a common voltage level between points designated as being coupled to "ground" or as being "grounded." In some instances, the "ground" is a same reference voltage level, and the value of other voltage levels described herein are relative to this reference voltage level.

The terms "pin" or "pins" and the terms "terminal" or "terminals" may be used interchangeably throughout this disclosure to refer to any type of electrically conductive lead, electrical contact, electrical connector pin, or electrically conductive pad, such as a solder pad, that may be utilized as part of electronic circuitry or an electrical device and that provides electrical connections to functional circuitry included in the electronic circuitry or the electrical device, including devices that may allow for physical and electrical connection and disconnection of the electronic circuitry or electrical device from other electrical circuitry and/or other electrical devices. The phrases "terminals" and "group of terminals" and "first group of terminals" and "second group of terminals" does not necessarily imply a plurality of terminals, and in some examples reference to "terminals" or a "group of terminals" or a "first group of terminals" or a "second group of terminals" refers to one or more terminals, which in some examples includes one single terminal, and in other examples includes a plurality of terminals.

FIG. 1 illustrates a block diagram 100 of a device 110 including functional circuitry 120 protected by path circuitry and an ESD active clamp circuit 140 in accordance with one or more example implementations and techniques described in this disclosure. Device 110 is not limited to any particular type of device, and may be an IC or may be electrical components mounted to one or more PCBs, or some other type of circuits to which ESD protection is being applied. Functional circuitry 120 represents functional circuits. Functional circuitry 120 is not limited to a particular type or number of circuits, and may include one or a plurality of circuits. Functional circuitry 120 may comprise different types of circuits, and different types of electrical components formed using different technologies, including but not limited to any of the types of circuits and devices described herein. The functions and features provided by functional circuitry 120 are not limited to any particular types of functions and/or features, and may be configured to perform any function(s) and/or feature(s) intended to be provided by device 110.

As illustrated, device 110 includes terminals 102, terminals 104, and a ground terminal 108. Terminals 102, terminals 104, and terminal 108 (GND) in some examples are configured to receive different classes of voltages, respectively. For example, terminal A1 of terminals 102 can be configured to receive a supply voltage at a first voltage level, and terminal B1 of terminals 104 can be configured to receive a second supply voltage that is a different voltage level as provided at terminal A1, and in some examples is a lower voltage level than the voltage level provided at terminal A1. In some examples, terminal 108 can be configured to receive a reference voltage level, designated as "GND." The voltage provided at terminal A1 may, for example, be a higher voltage than the voltage level provided at terminal B1, which in turn may be a higher voltage level than the reference voltage (GND) provided at terminal 108.

Terminals 102 are referred to as the Group A terminals, and may include a single terminal A1, or a plurality of terminals, A1-An, represented by dots 103. Each of the Group A terminals 102 may be electrically coupled to the functional circuitry 120, as represented by dots 103A, and may also be electrically coupled in parallel to the path circuitry and ESD clamp (hereinafter "circuitry") 140, as represented by dots 103B. Terminals 102 provide electrical connections to and from functional circuitry 120, and are not limited to a particular type of inputs or outputs relative to functional circuitry 120. One or more of terminals 102 may be coupled to a voltage supply (not shown in FIG. 1) to provide a voltage and power source for use by one or more circuits comprising functional circuitry 120. In various examples, one or more of terminals 102 are inputs to functional circuitry 120, providing voltage levels representative of signals or data, including digital and/or analog signal inputs. In various examples, one or more of terminals 102 are outputs from functional circuitry 120, receiving voltage levels generated by functional circuitry 120 representative of signals or data, including digital and/or analog signal outputs. Group A terminals operate within a same voltage class, wherein the terminals and the circuitry and/or devices coupled to these terminals, under normal operating conditions, have a same operating voltage range and/or a same maximum operating voltage. As an illustrative example, the Group A terminals 102 and circuitry/components coupled to terminals 102 may have a voltage class that comprises a minimum operating voltage Vmin of −0.3 volts and a maximum operating voltage Vmax of +56 volts, and thus an operating voltage range of −0.3 volts to +56 volts.

Terminals 104 are referred to as the Group B terminals, and may include a single terminal B1, or a plurality of terminals, B1-$B_N$, represented by dots 105. Each of the Group B terminals 104 may be electrically coupled to the functional circuitry 120, as represented by dots 105A, and may also be electrically coupled in parallel to the circuitry 140, as represented by dots 105B. Terminals 104 provide electrical connections to and from functional circuitry 120, and are not limited to a particular type of inputs or outputs relative to functional circuitry 120. One or more of terminals 104 may be coupled to a voltage supply (not shown in FIG. 1) to provide a voltage and power source for use by one or more circuits comprising functional circuitry 120. As noted above, a voltage supply coupled to one of terminals 104 can provide a voltage level, generally a lower voltage, than a voltage level being provided to one or more of terminals 102. In this way, one or more circuits within functional circuitry 120 that require a particular voltage level can be powered along with one or more other circuits included within functional circuitry 120 that require a different voltage level or levels to operate relative to the voltage level that is being provided through terminals 102. In various examples, one or more of terminals 104 are inputs to functional circuitry 120, providing voltage levels representative of signals or data, including digital and/or analog signal inputs. In various examples, one or more of terminals 104 are outputs from functional circuitry 120, receiving voltage levels generated by functional circuitry 120 representative of signals or data, including digital and/or analog signal outputs. Group B terminals 104 comprise terminals that operate within a same voltage class, wherein the terminals and the circuitry and/or devices coupled to these terminals, under normal operating conditions, have a same operating voltage range and/or a same maximum operating voltage. As an illustrative example, the Group B terminals 104 and circuitry/components coupled to terminals 104 may have a voltage class that comprises a minimum operating voltage Vmin of −0.3 volts and a maximum operating voltage Vmax of +40 volts, and thus an operating voltage range of −0.3 volts to +40 volts.

Terminal 108 in various examples provides a reference voltage level to both functional circuitry 120 and to circuitry 140. The reference voltage provided through terminals 108 may be referred to as "ground" or "GND," and in some examples is a voltage level that is lower than the maximum operating voltage level associated with Group A terminals 102 and is lower than the maximum operating voltage level associated with Group B terminals 104. In various examples, the voltage class for Group A terminals 102 is different from the voltage class associated with Group B terminals 104. In various examples, and for illustrative purposes in this disclosure, Group A terminals 102 are associated with a voltage class having a higher maximum operating voltage than the voltage class (and maximum operation voltage) associated with the Group B terminals 104.

As illustrated in FIG. 1, each of terminals 102, terminals 104, and terminal 108, in addition to functional circuitry 120, are also electrically coupled to circuitry 140. Circuitry 140 is configured to monitor terminals 102, terminals 104, and terminal 108 for the occurrence of ESD events through these connections, and to provide protection for functional circuitry 120 when an ESD event occurs on any of these terminals, including providing protection against both positive ESD events and negative ESD events. Circuitry 140 includes path circuitry and an ESD clamp configured to direct current away from functional circuitry 120 during the occurrence of an ESD event at any of terminals 102, 104, and 108, thus protecting functional circuitry 120 from the overvoltage or reverse-polarity voltages that may occur as a result of an ESD event at these terminals.

Figure 2A:
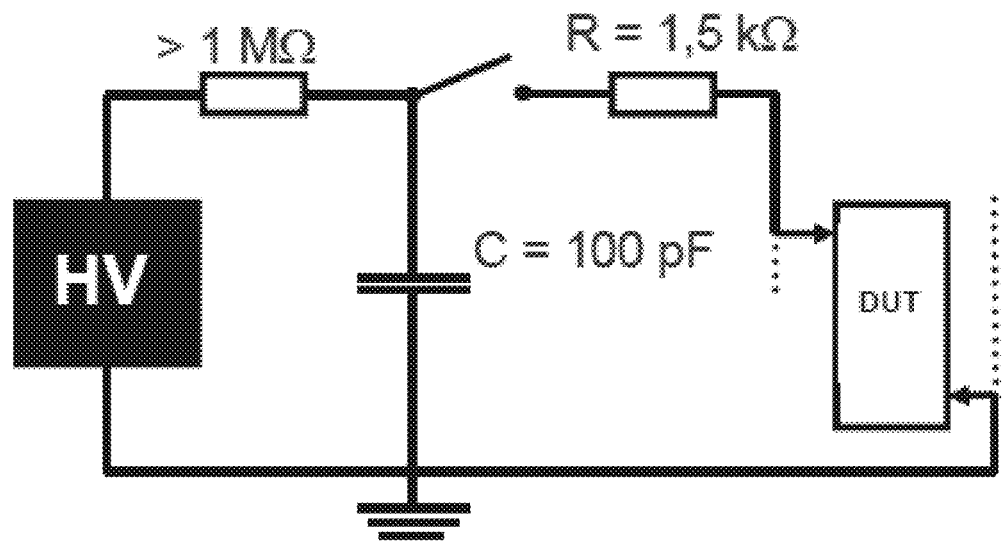
FIG. 2A shows a circuit representing a human body model (HBM) that can simulate a charged operator.
Figure 2B:
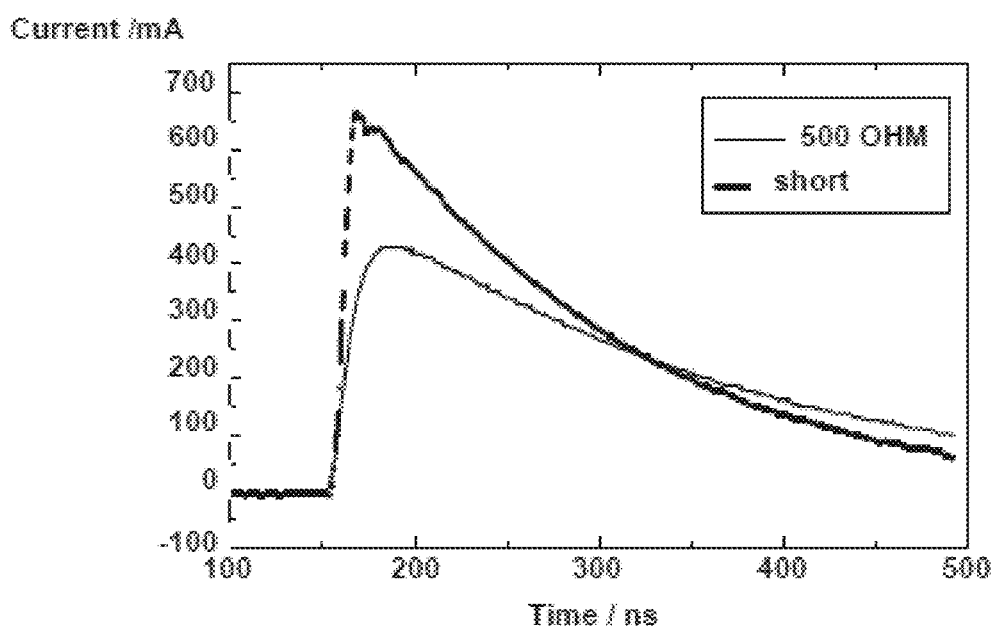
FIG. 2B shows an example of a discharge profile produced by the HBM circuit in FIG. 2A.

FIG. 2A shows a circuit representing a human body model that can simulate a charged operator. At a charging voltage of 1000 volts, when discharged, the circuit of FIG. 2A can produce a peak current of approximately 600-740 mA, with a rise time of approximately 2 ns to 10 ns and a decay time of approximately 130 ns to 170 ns. The discharge profile as shown in FIG. 2B represents an example of a type of discharge which the implementations and techniques of this disclosure may help to protect against.

Figure 3:
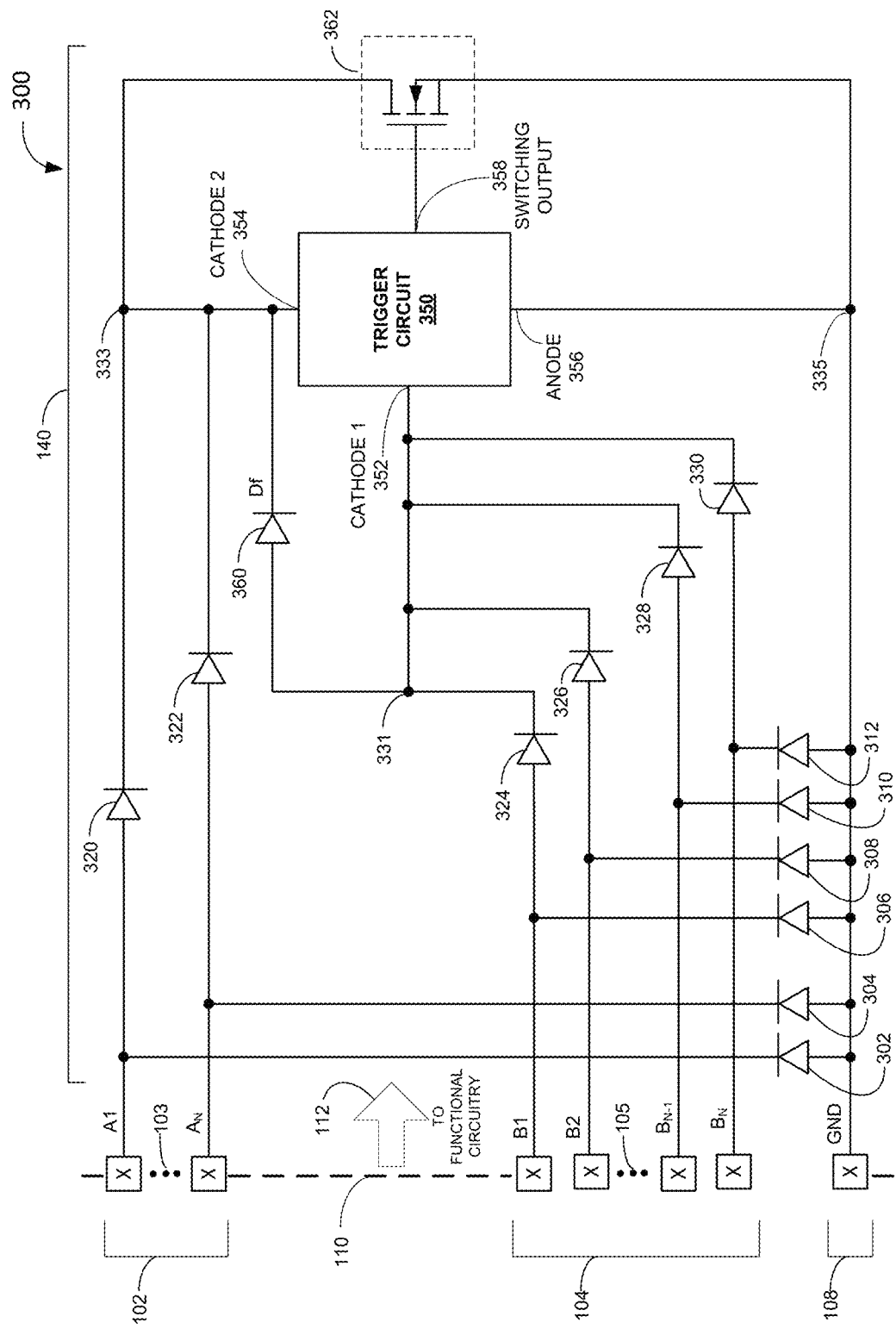
FIG. 3 illustrates a block diagram of an ESD protection circuit in accordance with one or more example implementations and techniques described in this disclosure.

FIG. 3 illustrates a schematic diagram 300 of an example device 110 including circuitry 140 and a trigger circuit 350 in accordance with one or more example implementations and techniques described in this disclosure. Elements illustrated in FIG. 3 that are the same or the equivalent of the element(s) as illustrated in FIG. 1 maintain a same reference number for the element(s) as used in FIG. 1. Device 110 as illustrated in FIG. 3 comprises terminals 102, terminals 104, and ground terminal 108. For clarity and simplicity, functional circuitry 120 is not shown in FIG. 3, but functional circuitry 120, and the connections between terminals 102, 104, and 108 that may be present in device 110 are represented by arrow 112. Circuitry 140 as shown in FIG. 1, comprising path circuitry and an ESD clamp circuit, are illustrated and described in more detail herein with respect to FIGS. 3, 4, and 5.

As shown in FIG. 3, each one of the terminals included in terminals 102 and terminals 104 are coupled through a reverse-biased diode to ground terminal 108 (GND). For terminals 102, each terminal is coupled to ground through one of diodes 302, 304. Diode 302 includes a cathode coupled to terminal A1, and an anode coupled to ground. Diode 304 includes a cathode coupled to terminal $A_N$, and an anode coupled to ground. If additional terminals 102 are present (as represented by dots 103), each of the additional terminals 102 would be individually coupled to ground in a same manner as shown for terminals A1 and $A_N$. For terminals 104, each terminal is coupled to ground through one of diodes 306, 308, 310, and 312. Diode 306 includes a cathode coupled to terminal B1, and an anode coupled to ground. Diode 308 includes a cathode coupled to terminal B2, and an anode coupled to ground. Diode 310 includes a cathode coupled to terminal $B_{N-1}$, and an anode coupled to ground. Diode 312 includes a cathode coupled to terminal $B_N$, and an anode coupled to ground. If additional terminals 104 are present (as represented by dots 105), each of the additional terminals 104 would be individually coupled to ground in a same manner as shown for terminals B1, B2, $B_{N-1}$, and $B_N$.

Diodes 302, 304, 306, 308, 310, and 312 form a part of the path circuitry of circuitry 140, and provide active protection of functional circuitry 120 when a negative ESD event occurs on any of terminals 102 or terminals 104. By way of illustration, terminal A1 of terminals 102 and diode 302 will be described as an example of this negative ESD event protection feature. As noted above, voltage levels provided at terminals A1 are higher voltage levels than the reference voltage level provided as ground at terminal 108. By way of example, a voltage supply providing +56 volts may be coupled to terminal A1, and the reference voltage provided as ground at terminal 108 is +0 (zero) volts. When such a voltage differential is provided between the cathode and the anode (e.g., the voltage at the cathode is more positive than the voltage at the anode) of diode 302, diode 302 is considered to be reverse-biased, and no current will flow, or only a negligible current flow will occur from terminal A1 to ground through diode 302. When diode 302 is reverse-biased, the voltage provided at terminal A1 will also be provided to the anode of diode 320, wherein diode 320 couples terminal A1 to trigger circuit 350 for the purpose of monitoring terminal A1 for any occurrences of a positive ESD event at terminal A1.

When a negative ESD event occurs at terminal A1, the voltage level provided at terminal A1 can drop to a level wherein the voltage at terminal A1 is less than the voltage being provided by the reference voltage at terminal 108. By way of example, the negative ESD event, without ESD protection, may cause the voltage at terminal A1 to drop to a negative voltage level of −10 volts relative to the zero-volt level provided at terminal 108. When such a voltage differential is provided between the cathode and the anode of diode 302 (e.g., the voltage at the anode is now more positive than the voltage at the cathode), diode 302 is considered to be forward-biased. When forward-biased, and once the difference between the voltage level at the cathode of diode 302 becomes greater than a threshold voltage level for diode 302 (typically 0.7 volts or 0.3 volts), diode 302 will begin to provide a low resistance path to conduct a flow of current from terminal 108 to terminal A1. Diode 302 in effect becomes an active "short" between terminal A1 and ground terminal 108, providing an alternative current path (path circuitry) between terminal 108 and terminal A1, and preventing the voltage at terminal A1 from being pulled down to the −10 volt level, and therefore protecting any of the functional circuitry 120 coupled to terminal A1 from being subjected to the reverse voltage generated by the negative ESD event. Once the negative ESD event ends, and the voltage present at terminal A1 may rise again to at least a level that reverse-biases diode 302, wherein once reverse-biased, diode 302 will automatically again block current flow (or only allow a negligible current flow) from terminal A1 relative to terminal 108.

In a similar manner, diode 304 performs these same functions with respect to terminal $A_N$, allowing the voltage provided at terminal $A_N$ to be provided to diode 322 when diode 304 is reverse-biased, and providing a path circuitry for terminal $A_N$ when a negative ESD event relative to terminal $A_N$ is occurring. As such, diode 304 is configured to provide protection for any of the functional circuitry 120 coupled to terminal $A_N$ during the occurrence of a negative ESD event involving terminal $A_N$. In addition, if additional terminals (represented by dots 103) were included in terminals 102, these additional terminals may be protected in a similar manner as described for terminals A1 and $A_N$ by additional diodes individually coupled to these terminals and terminal 108.

In a similar manner, each of terminals 104 can be individually protected against negative ESD events occurring on these terminals in a same manner as described above with respect to terminals 104. In various examples, the voltage levels present at terminals 104 may be less than the voltage levels provided at terminals 102, but is still at a higher voltage levels than the reference voltage level provided at terminal 108. By way of illustration, terminals 104 may operate normally at a maximum operating voltage level of Vmax=+40 volts, which is less than the Vmax of +56 volts for terminals 102, but is still a more positive voltage level relative to the +0 volts provided at terminal 108. Referring to terminal B1 as an illustrative example, a +40 volt level provided at terminal B1 will reverse-bias diode 306 so that no current, or only negligible current will flow from terminal B1 to terminal 108, and the voltage provided at terminal B1 will be provided to the anode of diode 324, wherein diode 324 couples terminal B1 to trigger circuit 350 for the purpose of monitoring terminal B1 for any occurrences of a positive ESD event at terminal B1.

When a negative ESD event occurs at terminal B1, the voltage level provided at terminal B1 can drop to a level wherein the voltage at terminal B1 is less than the voltage being provided by the reference voltage at terminal 108. By way of example, the negative ESD event, without ESD protection, may cause the voltage at terminal B1 to drop to a negative voltage level of −10 volts relative to the zero-volt level provided at terminal 108. When such a voltage differential is provided between the cathode and the anode of diode 306 (e.g., the voltage at the anode is now more positive than the voltage at the cathode), diode 306 is considered to be forward-biased. When forward-biased, and once the difference between the voltage level at the anode of diode 306 relative to terminal 108 becomes greater than a threshold voltage level for diode 306 (typically 0.7 volts or 0.3 volts), diode 306 will begin to provide a low resistance path to conduct a flow of current from terminal 108 to terminal B1. Diode 306 in effect becomes an active "short" between terminal B1 and ground terminal 108, providing an alternative current path (path circuitry) between terminal 108 and terminal B1, and preventing the voltage at terminal B1 from being pulled down to the −10 volt level, and therefore protecting any of the functional circuitry 120 coupled to terminal B1 from being subjected to the reverse voltage generated by the negative ESD event. Once the negative ESD event ends, and the voltage present at terminal B1 may rise again to at least a level that reverse-biases diode 306, wherein once reverse-biased, diode 306 will automatically again block current flow (or only allow a negligible current flow) from terminal B1 relative to terminal 108.

In a similar manner, each of diodes 308, 310, and 312 performs these same functions with respect to terminals B2, $B_{N-1}$, and $B_N$, respectively, allowing the voltage provided at these terminals to be provided to diodes 326, 328, and 330, respectively, when diodes 308, 310, and 312, respectively, are reverse-biased, and providing a path circuitry for terminals B2, $B_{N-1}$, and $B_N$, respectively, when a negative ESD event relative to the respective terminal is occurring. As such, diodes 308, 310, and 312 are configured to provide protection for any of the functional circuitry 120 coupled to terminals B2, $B_{N-1}$, and $B_N$, respectively, during the occurrence of a negative ESD event involving these terminals. In addition, if additional terminals (represented by dots 105) were included in terminals 104, these additional terminals may be protected in a similar manner as described for terminals B1, B2, $B_{N-1}$, and $B_N$ by additional diodes individually coupled to these terminals and terminal 108.

In addition to providing protection for functional circuitry 120 from negative ESD events, circuitry 140 is also configured to provide protection for a positive ESD event occurring on any of terminals 102 and 104. A positive ESD event occurs when a voltage provided at any of terminals 102 or terminals 104 exceeds the maximum operating voltage (Vmax) level designated for the voltage class for the terminals, either by exceeding exactly the Vmax level, or by exceeding the Vmax level by a predefined voltage margin. A positive ESD event can be defined to occur when a voltage greater than the Vmax+the predefined voltage margin is provided at a terminal of device 110 relative to a reference voltage level, such as the voltage level normally provided at terminal 108. By way of example, terminals 102 can be defined to have a voltage class having a maximum operating voltage Vmax of +56 volts, and voltage margin for the maximum operating voltage of +2 volts. In this example, any voltage provided at any of terminals 102 that exceeds +58 volts (Vmax+the margin voltage) is deemed to be a positive ESD event. In addition, terminals 104 may be set to a different voltage class having a maximum voltage Vmax that is different from, and in various examples less than the Vmax voltage level for terminals 102. As an illustrative example, when the Vmax level for terminals 102 is +56 volts, the Vmax level for terminals 104 may be set to a lower voltage class of +40 volts. In addition, the predefined voltage margin for terminals 104 may be set to a voltage value that is less than, equal to, or greater than the predefined voltage margin value used for terminals 102. As an illustrative example, when the maximum operating voltage (Vmax) for terminals 104 is set at +40 volts, the voltage margin for terminals 104 may be set at a value of +1 volt. In this example a positive ESD event for terminals 104 can be defined to occur when a voltage level of +41 volts (Vmax of +40 volts+voltage margin of +1.0 volts) is provided at any one of terminals 104.

Circuitry 140 is configured to provide protection for functional circuitry 120 in the event of positive ESD event on any of terminals 102 or terminals 104, and can provide this positive ESD event protection despite the fact that terminals 102 and 104 are set to operate in different voltage classes. In addition, circuitry 140 is configured to provide this protection using only a single ESD clamping circuit and a single, multiple-input trigger circuit. Using only a single clamping circuit to provide ESD protection for multiple terminals belonging to at least two different voltage classes allows for efficient ESD protection using less total numbers of devices, and less circuitry, and allows for a smaller footprint (smaller total circuit area used) than conventional ESD clamping circuits, as further disclosed herein.

As illustrated in FIG. 3, circuitry 104 comprises a trigger circuit 350 having a cathode 1 input 352, a cathode 2 input 354, an anode 356, and a switched output 358. Cathode 1 input 352 is coupled to node 331, cathode 2 input 354 is coupled to node 333, and anode 356 is coupled to node 335. Switched output 358 of trigger circuit 350 is coupled to a gate of semiconductor device 362. In various examples, semiconductor device 362 is the ESD clamp (big switch) operable to provide path circuitry for directing ESD current reaching terminals 102 and 104 away from functional circuitry 112. Semiconductor device 362 comprises a drain coupled to node 333, and a source coupled to node 335. In various examples, semiconductor device 362 is the one large device that requires a larger area than other devices including in circuitry 140. In some examples, semiconductor device 362 is an N-type laterally diffused metal oxide semiconductor (nLDMOS) device. In some examples, semiconductor device 362 has an area in a range of 5000 to 50000 μm².

As illustrated, each of terminals 102 is coupled through a separate diode to node 333 and cathode 2 input 354 of trigger circuit 350. Terminal A1 is coupled to the anode of diode 320, and the cathode of diode 320 is coupled to node 333, and thus to cathode 2 input 354 of trigger circuit 350. Terminal $A_N$ is coupled to the anode of diode 322, and the cathode of diode 322 is coupled to node 333, and thus to cathode 2 input 354 of trigger circuit 350. If additional terminals 102 are present (as represented by dots 103), each of the additional terminals 102 would be individually coupled to node 333 and cathode 2 input 354 of trigger circuit 350 in a same manner as shown for terminals A1 and $A_N$.

In addition, each of terminals 104 is coupled through a separate diode to node 331 and cathode 1 input 352 of trigger circuit 350. Terminal B1 is coupled to the anode of diode 324, and the cathode of diode 324 is coupled to node 331, and thus to cathode 1 input 352 of trigger circuit 350. Terminal B2 is coupled to the anode of diode 326, and the cathode of diode 326 is coupled to node 331, and thus to cathode 1 input 352 of trigger circuit 350. Terminal $B_{N-1}$ is coupled to the anode of diode 328, and the cathode of diode 328 is coupled to node 331, and thus to cathode 1 input 352 of trigger circuit 350. Terminal $B_N$ is coupled to the anode of diode 330, and the cathode of diode 330 is coupled to node 331, and thus to cathode 1 input 352 of trigger circuit 350. If additional terminals 104 are present (as represented by dots 105), each of the additional terminals 104 would be individually coupled to node 331 and thus to cathode 1 input 352 of trigger circuit 350 in a same manner as shown for terminals B1, B2, $B_{N-1}$, and $B_N$. In addition, node 331 (cathode 1 input 352) is coupled to the anode of diode (Df) 360, and the cathode of diode (Df) 360 is coupled to node 333 and cathode 2 input 354. Also, the anode 356 of trigger circuit 350 is coupled to ground and terminal 108 through node 335.

Because each of terminals 102 is coupled to trigger circuit 350 through cathode 2 input 354, trigger circuit 350 is configured to monitor a voltage level at each of the terminals 102. In addition, because each of terminals 104 is coupled to trigger circuit 350 through the cathode 1 input 352, trigger circuit 350 is configured to monitor a voltage level at each of the terminals 104. Under normal operating condition, wherein "normal operation conditions" is defined as a condition where no positive ESD events are occurring at any of terminals 102 or at any of terminals 104, trigger circuit 350 is configured to provide a signal level at switched output 358 that controls semiconductor device 362 to be in an "OFF" state. When semiconductor device 362 is in the "OFF" state, the source and drain of semiconductor device 362 act like an extremely high resistance connection, or in effect act as an open switch, between nodes 333 and 335. When semiconductor device 362 is in this "OFF" state, voltage levels provided at node 333, and voltage levels that may be coupled from node 331 through diode 360 to node 333, are not coupled to node 335 and ground through semiconductor device 362, and thus remain at the levels provided by one or more of the terminals coupled to these nodes, respectively.

In some examples, under these normal operating conditions and when semiconductor device 362 is in the "OFF" state, the highest voltage level provided on any of terminals 102 will be substantially provided at node 333. By way of illustration, if a voltage supply coupled to terminal A1 is providing a voltage level of +56 volts at terminal A1, and this voltage level is below a threshold voltage (Vtrigger2) set by trigger circuit 350 for determining that a positive ESD event is occurring at any of terminals 102, the voltage level of +56 volts will be provided through diode 320 to node 333. Because semiconductor device 362 is in the "OFF" state, no current, or a negligible current will flow from node 333 through semiconductor device 362 to node 335. In addition, when no voltage exceeding the threshold voltage (Vtrigger2) is present at node 333, trigger circuit 350 is configured to allow no current flow into the cathode 2 input 354 from node 333. In addition, even if lower voltages than the voltage provided at terminal A1 exist for example at terminal $A_N$, or at node 331, diodes 322 and 360 would be reverse-biased, and thus block current flow from node 333 to either of terminals $A_N$ or to node 331 from node 333. Circuitry 140 would act in a same manner in instances were, under normal operating conditions and wherein semiconductor device 362 is in the "OFF" state, but wherein terminal $A_N$ provides a voltage level that is higher than the voltage level provided at terminal A1. In such instances, and wherein the voltage level provided by terminal $A_N$ does not exceed the threshold voltage (Vtrigger2) set for cathode 2 input 354, the higher voltage provided at terminal $A_N$ would be provided to node 333, but trigger circuit 350 is configured to allow no current flow into the cathode 2 input 354 from node 333. In addition, even if lower voltages than the voltage provided at terminal $A_N$ exist for example at terminal A1, or at node 331, diodes 320 and 360 would be reverse-biased, and thus block current flow from node 333 to either of terminals A1 or to node 331 from node 333 based on the higher voltage being provided to node 333 by terminal $A_N$. If additional terminals (represented by dots 103) were present in terminals 102, these additional terminal can be configured to provide the highest voltage to node 333 without creating a current flow through semiconductor device 362, into cathode 2 input 354, to node 331, or back toward other terminals of terminals 102 for in the same manner described with respect to terminals A1 and $A_N$.

In some examples, under these normal operating conditions and when semiconductor device 362 is in the "OFF" state, the highest voltage level provided on any of terminals 104 will be substantially provided at node 331 and 333. By way of illustration, if a voltage supply coupled to terminal B1 is providing a voltage level of +40 volts at terminal B1, and voltage level is below a threshold voltage (Vtrigger1) set by trigger circuit 350 for determining that a positive ESD event is occurring at any of terminals 104, the voltage level of +40 volts will be provided through diode 324 to node 331. Because semiconductor device 362 is in the "OFF" state, no current, or a negligible current will flow from node 331 through diode (Df) 360 to node 333 and through semiconductor device 362 to node 335. In addition, when no voltage exceeding the threshold voltage (Vtrigger1) is present at node 331, trigger circuit 350 is configured to allow no current flow into the cathode 1 input 352 from node 331. In addition, even if lower voltages than the voltage provided at terminal B1 exist for example at terminal $B_N$, or at terminal $A_N$, the diodes coupling each of the terminals 104 to node 331 would be reverse-biased, and thus block current flow from node 331 back to any of terminals 104 having a lower voltage than B1, and the diodes coupling terminals 102 to node 333 would prevent current flow from node 331 back to any terminals 102 have a lower voltage level than the voltage level being provided by terminal B1.

Circuitry 140 would act in a same manner in instances were, under normal operating conditions and wherein semiconductor device 362 is in the "OFF" state, but wherein terminal B2, $B_{N-1}$, or $B_N$ provides a voltage level that is higher than the voltage level provided at terminal B1 or any other of terminals 104. In such instances, and wherein the voltage level provided by a terminal of terminals 104 having the highest voltage level does not exceed the threshold voltage (Vtrigger1) set for cathode 1 input 352, the higher voltage provided at that terminal would be provided to node 331 and 333, but trigger circuit 350 is configured to allow no current flow into the cathode 1 input 354 from node 331 under these conditions. If additional terminals (represented by dots 105) were present in terminals 104, these additional terminal can be configured to provide the highest voltage to node 331 without creating a current flow through semiconductor device 362, into cathode 1 input 352, into cathode 2 input 354, or back toward other terminals of terminals 102 for in the same manner described with respect to terminals B1 and $B_N$.

As described above, terminals 102 and terminals 104 may be configured to operate at different voltage class levels. In order to monitor terminals in two different voltage class levels, trigger circuit 350 comprises cathode 2 input 354 that can be set to a threshold voltage (Vtrigger2) to trigger the ESD clamp circuit including semiconductor device 362 when a positive ESD event occurs on any of terminals 102, and can be set to have a separate threshold voltage (Vtrigger1) to trigger the ESD clamp circuit including semiconductor device 362 when a positive ESD event occurs on any of terminals 104. Trigger circuit 350 in various examples is configured to provide a different, and in some examples higher value for the threshold voltage (Vtrigger2) for cathode 2 input 354 compared to the threshold voltage (Vtrigger1) set of cathode 1 input 352, as will be more fully described with respect to FIG. 4.

Referring again to FIG. 3, when a positive ESD event is occurring on one of terminals 102, a voltage that exceeds the threshold voltage Vtrigger2 for the cathode 2 input 354 will be reached on the terminal of terminals 102 experiencing the ESD event, and thus will be provided at node 333, through the diode coupling the terminal experiencing the positive ESD event to node 333. As the voltage level at node 333 exceeds the threshold voltage (Vtrigger2) and is received at cathode 2 input 354. Trigger circuit 350 senses the voltage level that exceeds the threshold voltage (Vtrigger2) level, and is configured to generate and provide a signal at switched output 358, that when provided to the gate of semiconductor device 362 causes semiconductor device 362 to switch from the "OFF" state to an "ON" state. When semiconductor device 362 is in the "ON" state, semiconductor device 362 allows a current to flow from node 333 to node 335 (ground) through semiconductor device 362. Semiconductor device 362 is sized to be able to allow a large current flow though the semiconductor device 362 without damage to semiconductor device 362. In various examples, semiconductor device 362 is operable to allow current flows in a range of 1 to 30 amps without damage.

In addition, the current flow through semiconductor device 362 results in a voltage drop being generated between the source and the drain of the semiconductor device 362, and thus is operable to control (clamp) the voltage at node 333 to a voltage level equal to the ground voltage level provided at terminals 108, (for example zero volts) plus the voltage drop across semiconductor device 362. By allowing a current flow through semiconductor device 362, circuitry 140 provides a path circuitry to direct ESD current away from functional circuitry 112 to protect functional circuitry 112 from the excess levels of current induced by the ESD event. In addition, by regulating the amount of current flow through semiconductor device 362, and thus controlling the voltage drop generated across semiconductor device 362, circuitry 140 is able to clamp the voltage at the drain of semiconductor device, and thus clamp the voltage at node 333 and at each of terminals 102 to a voltage level at or just above the threshold voltage (Vtrigger2) level, and thus protect the functional circuitry 112 that may be coupled to terminals 102 from being subjected to a voltage level that would be induced at terminals 102 by the ESD event if the ESD voltage protection was not applied, and which may be a much higher voltage level than the maximum operating voltage for the functional circuitry 112 coupled to terminals 102.

In various examples, trigger circuit 350 is configured to continue to monitor the voltage present at node 333, and based on this voltage, to regulate the signal (voltage level) provided at switched output 358 so as to maintain device 362 in the "ON" state and to regulate the current flow through device 362 to prevent the voltage at node 333 from exceeding the threshold voltage (Vtrigger2) or from exceeding the threshold voltage by more than a predetermined voltage margin. When the positive ESD occurrence at terminals 102 no longer exists, and thus the voltage level at node 333 returns to a voltage level that is below the threshold voltage level, trigger circuit 350 is configured to provide an output signal (in some examples, a voltage level) at switched output 358 that when provided to the gate of device 362, returns semiconductor device 362 again to the "OFF" state.

Similarly, when a positive ESD event is occurring on one of terminals 104, a voltage that exceeds the threshold voltage Vtrigger1 for the cathode 1 input 352 will be reached on the terminal of terminals 104 experiencing the ESD event, and thus will be provided at node 331, through the diode coupling the terminal experiencing the positive ESD event to node 331. As the voltage at node 331 that exceeds the threshold voltage (Vtrigger1) is received at cathode 1 input 352, trigger circuit 350 senses the voltage level that exceeds the threshold voltage (Vtrigger1) level, and is configured to generate and provide a signal at switched output 358, that when provided to the gate of semiconductor device 362, causes semiconductor device 362 to switch from the "OFF" state to an "ON" state. When semiconductor device 362 is in the "ON" state, semiconductor device 362 allows a current to flow from node 331, through diode (DF) 360 to node 333, then through semiconductor device 362 to node 335 (ground). As described above, semiconductor device 362 is sized to be able to allow a large current flow though the semiconductor device 362 without damage to semiconductor device 362. In addition, the current flow through semiconductor device 362 results in a voltage drop being generated between the source and the drain of the semiconductor device 362, and thus is operable to control (clamp) the voltage at node 333 to a voltage level equal to the ground voltage level provided at terminals 108, (for example zero volts) plus the voltage drop across semiconductor device 362. In doing so, the voltage at node 331 will be clamped to a voltage level of 333 plus a forward-biasing voltage level (typically 0.7 volts) created by the current flow from node 331 through diode 360 to node 333.

By allowing a current flow through semiconductor device 362, circuitry 140 provides a path circuitry to direct ESD current away from functional circuitry 112 to protect functional circuitry 112 from the excess levels of current induced by the ESD event. In addition, by regulating the amount of current flow through semiconductor device 362, and thus controlling the voltage drop generated across semiconductor device 362, circuitry 140 is able to clamp the voltage at the drain of semiconductor device, and thus clamp the voltage at nodes 333 and 331, and thus at each of terminals 104 to a voltage level at or just above the threshold voltage (Vtrigger1) level, and thus protect the functional circuitry 112 that may be coupled to terminals 104 from being subjected to a voltage level that would be induced at terminals 104 by the ESD event if the ESD voltage protection was not applied, and which may be a much higher voltage level than the maximum operating voltage for the functional circuitry coupled to terminals 104.

In various examples, trigger circuit 350 is configured to continue to monitor the voltage present at node 331, and based on this voltage, to regulate the output signal (voltage level) provided at switched output 358 so as to maintain device 362 in the "ON" state and to regulate the current flow through device 362 to prevent the voltage at node 331 from exceeding the threshold voltage (Vtrigger1) or from exceeding the threshold voltage by more than a predetermined voltage margin. When the positive ESD occurrence at terminals 104 no longer exists, and thus the voltage level at node 331 returns to a voltage level that is below the threshold voltage level of Vtrigger1, trigger circuit 350 is configured to provide an output signal (in some examples, a voltage level) at switched output 358 that when provided to the gate of device 362, returns semiconductor device 362 again to the "OFF" state.

Thus, semiconductor device 362 provide a switchable path circuitry between both nodes 333 and node 331 to ground terminal 108 that can be switched on during a positive ESD event occurring at any of terminals 102 and/or 104 to protect functional circuitry 112 coupled to terminals 102 and/or 104, and to switch off the path circuitry through semiconductor device 362 when normal operating conditions (no positive ESD events occurring) relative to terminals 102 and 104 exist. Further, circuitry 140 provides the advantage of being capable of monitoring, simultaneously, different groups of terminals for the occurrence of positive ESD events at the terminals, each group that may include multiple terminals, and wherein the groups may operate at different voltage classes. In addition to monitoring these terminal configurations for the occurrence of positive ESD events, circuitry 140 is capable of providing path circuitry to direct ESD current away from functional circuitry, and clamp a voltage being coupled to functional circuitry to protect the functional circuitry during a positive ESD event using a single ESD clamp device and a single trigger circuit having multiple-inputs.

Further, by including forward-biased diodes on each of these terminals with a same voltage class, a single input to the trigger circuit can be used to monitor all of these terminals for positive ESD events even if the terminals within the groups provide voltages that vary and/or that at times are a lower voltage level than the voltage level provided at that same time by other terminals within that same group of terminals. For example, a single input to the trigger circuit 350 is operable to monitor terminals within a group of terminals operating in a same voltage class, wherein one of the terminals is coupled to a voltage supply providing a constant voltage level at or near the maximum operating voltage of the voltage class for this group of terminals, and wherein one or more of the terminal within the group provide data inputs involving variations in the voltage level provided on the terminal, for example voltage levels varying form near the minimum voltage level to just below the maximum operation voltage level for the class of terminals.

Figure 4:
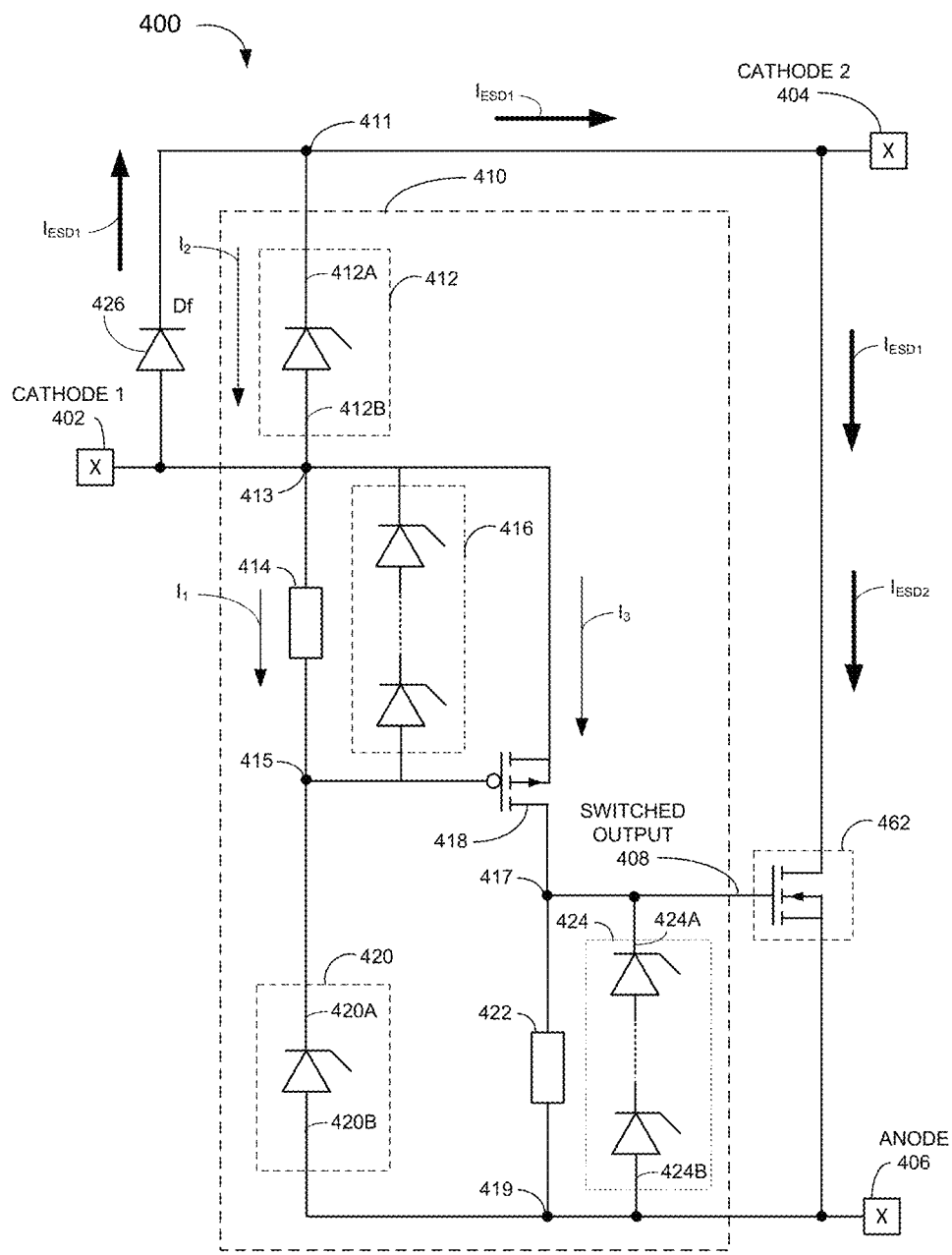
FIG. 4 illustrates a schematic diagram of an example trigger circuit in accordance with one or more example implementations and techniques described in this disclosure.

FIG. 4 illustrates a schematic diagram 400 of an example trigger circuit 410 in accordance with one or more example implementations and techniques described in this disclosure. In various examples, trigger circuit 410 is incorporated into device 110 and the path circuitry and ESD clamp 140 as illustrated and described above with respect to FIG. 1. In various examples, trigger circuit 410 is trigger circuit 350 as illustrated and described herein with respect to FIG. 3. However, examples of trigger circuit 410 are not limited to the examples of FIG. 1 or FIG. 3, and may be provided separately and configured for incorporation into other circuits and devices to provide the features and functions as described herein, and the equivalents thereof.

As illustrated, trigger circuit 410 comprises a cathode 1 input 402 coupled to node 413, a cathode 2 input 404 coupled to node 411, an anode 406 coupled to node 419, and a switched output 408. Trigger circuit 410 further includes a first stack of Zener diodes 420, resistor 414, a transistor 418, a second stack of Zener diodes 412, and a resistor 422. In some examples, trigger circuit 350 optionally includes a third stack of Zener diodes 416 operable to provide overvoltage protection to the gate of transistor 418. In various examples, transistor 418 is a p-channel MOSFET. In some examples, trigger circuit 350 optionally includes a fourth stack of Zener diodes 424 operable to provide overvoltage protection to the gate of semiconductor device (big switch) 462. The first stack of Zener diodes 420 is illustrated as a single Zener diode, but may comprise one or more Zener diodes, the number of Zener diodes included in the first stack of Zener diodes 420 being adjusted to provide the desired trigger voltage (Vtrigger1) for the cathode 1 input 402, as further described below. A cathode terminal 420A of the first stack of Zener diodes 420 is coupled to node 415. An anode terminal 420B of the first stack of Zener diodes 420 is couple to node 419 (anode 406). Resistor 414 includes a first terminal coupled to node 413, and a second terminal coupled to node 415. The second stack of Zener diodes 412 is illustrated as having a single Zener diode, but may comprise one or more Zener diodes, the number of Zener diodes included in the second stack of Zener diodes 412 being adjusted to provide the desired trigger voltage (Vtrigger2) for the cathode 2 input 404, as further described below. A cathode terminal 412A of the second stack of Zener diodes 412 is coupled to node 411. An anode terminal 412B of the second stack of Zener diodes 412 is coupled to node 413.

As illustrated, trigger circuit 410 can be configured so that cathode 1 input 402 is coupled to an anode of diode (Df) 426, and the cathode of diode (Df) 426 is coupled to node 411 and to cathode 2 input 404. In addition, a drain of semiconductor device 462 is coupled to node 411, and a source of semiconductor device 462 is coupled to node 419. In various examples, semiconductor device 462 is semiconductor device 362 illustrated and described with respect to FIG. 3, and may provide one or more of the features and functions described in this disclosure being associated with the "big switch." As further described below with respect to FIG. 4, trigger circuit 410 is configured to provide an output signal at switched output 408 to control semiconductor device 462 so that semiconductor device 462 is in an "OFF" state, wherein semiconductor device 462 act like an open switch and does not allow a flow of current, or allows only a negligible amount of current to flow from node 411 to anode 406. When a positive ESD event is detected on one or more terminals (not shown in FIG. 4) that may be coupled to and monitored by cathode 1 input 402, trigger circuit 410 is configured to provide an output signal at switched output 408 to turn semiconductor device to an "ON" state. When semiconductor device 462 has been triggered to the "ON" state, ESD current induced in the terminals coupled to cathode 1 input 402, represented by arrow $I_{ESD1}$, flows from cathode 1 input 402 through diode (Df) 426 to node 411, and from node 411 through semiconductor device 462 to anode 406, which may be coupled to ground or a reference voltage level. In addition, in a manner similar to that described above with respect to semiconductor device 362, when operating in the "ON" state, semiconductor device 462 is operable to clamp the voltage level that can be provided at cathode 1 input 402, thus redirecting ESD current and prevent an overvoltage condition from occurring at any terminals that may be coupled to cathode 1 input 402.

Similarly, when a positive ESD event is detected on one or more terminals (not shown in FIG. 4) that may be coupled to and monitored by cathode 2 input 404, trigger circuit 410 is configured to provide an output signal at switched output 408 to turn semiconductor device to an "ON" state. When semiconductor device 462 has been triggered to the "ON" state, ESD current induced in the terminals coupled to cathode 2 input 404, represented by arrow $I_{ESD2}$, flows from cathode 2 input 404 through semiconductor device 462 to anode 406, which may be coupled to ground or a reference voltage level. Again, in a manner similar to that described above with respect to semiconductor device 362, when operating in the "ON" state, semiconductor device 462 is operable to clamp the voltage level that can be provided at cathode 2 input 404, thus redirecting ESD current and prevent an overvoltage condition from occurring at any terminals that may be coupled to cathode 2 input 404.

In operation, trigger circuit 410 is configured to monitor a multiple number of terminals for overvoltage condition, including positive ESD events occurring on any of the terminals, and is further capable of monitoring for these overvoltages and positive ESD events for groups of terminals belonging to at least two different voltage classes. As noted above, voltage classes refer to a range of voltages that a particular terminal or group of terminals are configured to operate within, including a maximum operating voltage (Vmax) corresponding to the highest voltage level the terminals within a particular voltage class should provide under normal operating conditions. When a voltage level that exceeds the maximum operating voltage by some predetermined voltage margin is provided at one or more of the terminals with a given group of terminals operating in a common voltage class, that event is considered an overvoltage or a positive ESD event (when triggered by a static charge as described above). For each voltage class of terminals being monitored by trigger circuit 410, trigger circuit 410 is configured to provide a trigger threshold voltage, wherein if a voltage level that exceeds the trigger threshold voltage for that voltage class of terminals is provided at any of the terminals being monitored, trigger circuit 410 is configured to generate and to provide an output signal at switched output 408 that will cause semiconductor device 462 to operate in an "ON" state. As described above, when operating in the "ON" state, semiconductor device is operable to be controlled by trigger circuit 410 to redirect ESD current, and to clamp the voltage provided at the group of terminals that experiences the ESD event, and thus protect the functional circuitry coupled to these terminals. In addition, trigger circuit 410, as illustrated in FIG. 4 includes two separate cathode inputs, (cathode 1 input 402 and cathode 2 input 404). Each of these cathode inputs is capable of monitoring one or more terminals that belong to a common voltage class, and wherein the terminals that are being monitored by one of the cathode inputs to trigger circuit 410 is a different voltage class than the terminals being monitored by the other cathode input to trigger circuit 410. This feature allows trigger circuit 410 to provide positive ESD event protection to two separate sets of terminals that belong to two different voltage classes. It would be understood by one of skill in that art, and as further described below, that trigger circuit 410 can be further modified to add additional cathode inputs, and thus to provide positive ESD event protection for more than two sets of terminals wherein each set of sets of terminals belong to a different voltage class.

Various aspects of the operation of trigger circuit 410 are described with respect to the cathode 1 input 402. In a manner similar to that described above with respect to CATHODE 1 input 352 and FIG. 3, the cathode 1 input 402 of trigger circuit 410 may be coupled to one or more terminals belonging to a common voltage class. For illustrative purposes in the discussion of FIG. 4, an example voltage of +40 will be used as the maximum operating voltage (Vmax) assigned to the terminals that cathode 1 input 402 is coupled to. Using this example, a value for a trigger threshold (Vtrigger1) is determined for CATHODE 1 input 402. The value set for Vtrigger1 can be the Vmax (+40 volts in the example), or the Vmax plus a margin voltage. For this example, a margin voltage of +2 volts is used, and thus the trigger threshold voltage (Vtrigger1) for the cathode 1 input 402 in the example is set to a value of +42 volts.

When the voltage provided at cathode 1 input 402 is below the Vtrigger1 voltage level (and assuming no ESD events are occurring at the terminals being monitored by the CATHODE 2 input 404 for the purposes of this illustrative example), trigger circuit 410 is configured to provide an output signal at switched output 408 that causes semiconductor device 462 to be in an "OFF" state, resembling an open switch between nodes 411 and anode 406. As described above, when in the 'OFF" state, no current is flowing from cathode 1 input 402 to node 411 and through semiconductor device 462 to anode 406 outside trigger circuit 410, and so the voltage being provided at any of the terminals outside trigger circuit 410 being monitored by trigger circuit 410 are maintained at their respective voltage levels. If any of the terminals being monitored by cathode 1 input 402 experience an ESD event, the voltage provided at the cathode 1 input 402 will rise to a voltage level that exceeds the threshold voltage Vtrigger1 level. Once the voltage level being provided at cathode 1 input 402 exceeds the Vtrigger1 voltage level, trigger circuit 410 is configured to provide an output signal at switched output 408 that transitions device 462 from an "OFF" state to an "ON" state. When in the "ON" state, device 462 allows current to flow through device 462 from the cathode 1 input 402 through diode (Df) 426 to node 411, and then on to anode 406. The current flow through device 462 creates a voltage drop across device 462, and thus pulls the voltage at node 411 to a voltage level determined by the voltage provided at anode 406 plus the voltage drop across device 462, and thus pulls the voltage at the cathode 1 input 402 to a voltage level determined by the voltage at node 411 plus the voltage drop across diode (Df) 426.

Device 462 allows current to flow through device 462 when in the "ON" state. In some examples, device 462 operates in a linear operation region of the semiconductor device when in the "ON" state. In some examples, device 462 operates in a saturation operation region of the semiconductor device when in the "ON" state. In some examples, device 462 operates in a linear or saturation operation region with significant current conduction of the inherent parasitic bipolar transistor of the semiconductor device when in the "ON" state.

By varying the output signal provided at the switched output 408, trigger circuit 410 is operable to regulate semiconductor device 462 to control the amount of current flowing through semiconductor device 462, and thus to control (clamp) the voltage level at node 411, and thus at cathode 1 input 402, to some maximum clamped voltage level. In various examples, trigger circuit 410 is configured to control semiconductor device 462 so that the maximum clamped voltage level that can be reached at the cathode 1 input 402 during the ESD event is a voltage level just above the Vtrigger1 voltage level. In this manner, trigger circuit 410 is operable to clamp the voltage level that can be reached during an ESD evet at any of the terminals that may be coupled to and monitored by the cathode 1 input 402 to a voltage level that prevents damage to the functional circuitry that may also be coupled to these terminals.

Setting the Vtrigger1 voltage for the cathode 1 input 402 in various examples is set by adjusting the type and number (s) of Zener diodes included in the first stack of Zener diodes 420. By arranging the type(s) and number(s) of Zener diodes that are "stacked" (coupled in series) to form the first stack of Zener diodes 420, the predetermined threshold voltage level between terminal 420A and 420B can be configured, which sets the Vtrigger1 threshold voltage. Again using the +42 volts as an illustrative Vtrigger1 threshold voltage level for cathode 1 input 402, a set of Zener diodes can be selected wherein each of the Zener diodes has a reverse-breakdown voltage of 7 volts. By coupling six of these diodes in series to form the first stack of Zener diodes 420, a total reverse-breakdown voltage of +42 volts (six diodes times 7 volts/per diode) can be created between terminals 420A and 420B. It would be understood by those of skill in the art that by selecting different combination of types and numbers of diodes that have the same or different values for reverse-breakdown voltages, the first stack of Zener diodes 420 may be arranged to provide a different predetermined threshold voltage level, and thus can be configured to provide a trigger threshold voltage level for groups of terminals having different voltage classes from the above described example.

When the voltage level provided at the cathode 1 input 402 is less than the Vtrigger1 voltage level, that voltage is provided at node 413, and coupled through resistor 414 to node 415 and to the cathode terminal 420A of the first stack of Zener diodes 420. However, because that voltage does not exceed the reverse-breakdown voltage of the first stack of Zener diodes 420, no current flows from node 413 through resistor 414 to node 415 and on to anode 406 through the first stack of Zener diodes 420. With no current flow through resistor 414, resistor 414 pulls the gate of transistor 418 up to the voltage provided at node 413, which is the same voltage provided at the source of transistor 418, thus turning transistor 418 off (non-conducting state). With transistor 418 turned off, no current flows from node 413 through transistor 418, and therefore no current flow is provided to or flows through resistor 422. Resistor 422 couples the switched output 408 to anode 406, and wherein as noted above, anode 406 is also coupled to the source of semiconductor device 462. With no current is flowing through resistor 422, resistor 422 will pull the voltage level provided at switched output 408 to the voltage level provided at anode 406, which is the same voltage level being provided at the source of semiconductor device 462. When in this condition, the output signal provided at the switched output 408 turns semiconductor device to the "OFF" (and thus non-conducting) state and no current (or only a negligible amount of current) will flow through semiconductor device 462 as described above for the "OFF" state with respect to semiconductor device 462. In this condition, no current is being redirected from the cathode 1 input 402, and semiconductor device is not controlling the voltage provided at the cathode 1 input 402.

When the voltage level provided at the cathode 1 input 402 is equal to or exceeds the Vtrigger1 voltage level, that voltage level will initially be coupled to node 415 through resistor 414. Because this voltage level provided at node 415 exceeds the predetermined threshold voltage level set for the first stack of Zener diodes 420, a flow of current will be established from the cathode terminal 420A through the first stack of Zener diodes 420 to anode 406. This flow of current will be provided through resistor 414 ($I_1$), generating a voltage drop (voltage differential) across resistor 414, which will also be applied between the gate and the source of transistor 418. The resistance value of resistor 414 is selected so that the voltage differential generated across resistor 414 by this initial current flow will bias transistor 418 to turn on and couple node 413 to node 417, and allow a flow of current from node 413 through transistor 418 to node 417 and resistor 422 (I₃). The flow of current through resistor 422 generates a voltage drop (voltage differential) across resistor 422. The voltage differential generated across resistor 422 relative to the voltage provided at anode 406 is provided at switched output 408, and thus to the gate of semiconductor device 462. The resistance value of resistor 422 is selected so that the voltage differential generated across resistor 422 by this initial current flow will provide an output signal at switched output 408 that will cause semiconductor device 462 to switch from the "OFF" state to the "ON" state, and begin allowing current to flow from the cathode 1 input 402 through diode (Df) 426 to node 411 and through semiconductor device 462 to anode 406, represented by arrow $I_{ESD1}$ in FIG. 4. The amount of current flow through semiconductor device 462 is sufficient so that the voltage drop generated across semiconductor device 462, and thus provided at the cathode 1 input 402 (with the added forward biasing voltage drop across diode (Df) 426) is clamped to a voltage level that prevents damage to any functional circuitry that may be coupled to the terminals coupled to and monitored by the cathode 1 input 402.

In various examples, as the voltage level provided at the cathode 1 input 402 increases, the current flow through resistor 422 will also increase, generating a larger voltage drop (voltage differential) across resistor 422, and thus increasing the biasing voltage being provided as the output signal to semiconductor device 462 by the switched output 408. This increase in biasing of semiconductor device 462 in some examples causes semiconductor device 462 to move to a different point in the operating region of semiconductor device 462, lowering the effective resistance of semiconductor device 462 and allowing more current to flow through semiconductor device 462, generating a smaller voltage drop (voltage differential) across semiconductor device 462. This increase in current flow and resulting smaller voltage differential across semiconductor device offsets the increase in the voltage provided at the cathode 1 input 402.

In various examples, when the voltage level at the cathode 1 input 402 decreases, but is still above the threshold voltage Vtrigger1 level, a smaller current flow will result through resistor 422, thus lessening the voltage drop (voltage differential) generated across resistor 422, and thus lower the voltage level provided as the output signal by switched output 408 to the gate of semiconductor device 462. This lower of the voltage level being provided as the output signal will, in some examples, cause semiconductor device 462 to move to a different point in the operating region of semiconductor device 462, raising the effective resistance of semiconductor device 462 and allowing less current to flow through semiconductor device 462, generating a larger voltage drop (voltage differential) across semiconductor device 462. This decrease in current flow and resulting larger voltage differential across semiconductor device 462 adjusts for the decrease in the voltage provided at the cathode 1 input 402.

When the voltage level provided at all of the terminal being monitored by the cathode 1 input 402 have returned to a voltage level that is below the threshold voltage Vtrigger1 set for the cathode 1 input 402, the voltage provided at node 413 will again be less than the predetermined threshold voltage level set for the first stack of Zener diodes 420. As such, the first stack of Zener diodes 420 will stop conducting current from terminal 420A through the first stack of Zener diodes 420 to anode 406, and thus current will no longer flow through resistor 414. With no current flowing through resistor 414, no voltage drop (voltage differential) will be generated across resistor 414, and thus the voltage provided at node 415 and at the gate of transistor 418 will return to the voltage provided at 413 and the source of transistor 418. When provided with the same voltage at the gate and at the source, transistor 418 will turn off, shutting off the flow of current from node 413 through resistor 422 to anode 406. Without a flow of current through resistor 422, the voltage provided as the output signal at the switched output 408 will be pulled down through resistor 422 to the voltage level provided at anode 406, which is the same voltage level being provided to the source of semiconductor device 462. When in this condition, semiconductor device will transition from the "ON" state to the "OFF" (non-conductive) state. In the "OFF" state, as described above no current (or only a negligible amount of current) will flow through semiconductor device 462, and thus will no longer control the voltage provided at the cathode 1 input 402. Under these conditions, the voltage provided at the cathode 1 input 402 will return to the highest voltage level provided by any of the terminals coupled to and being monitored by the cathode 1 input 402.

Various aspects of the operation of trigger circuit 410 are described below with respect to the cathode 2 input 404. In a manner similar to that described above with respect to cathode 2 input 354 and FIG. 3, the cathode 2 input 404 of trigger circuit 410 may be coupled to one or more terminals belonging to a common voltage class. For illustrative purposes in the discussion of FIG. 4, an example voltage of +56 will be used as the maximum operating voltage (Vmax) assigned to the terminals that cathode 2 input 404 is coupled to. Note that the Vmax for the terminals being monitored by the cathode 2 input 404 is a higher voltage level relative to terminal 108 and a higher voltage level than the Vmax for terminals being monitored by the cathode 1 input 402. Using this +56 volt example for the Vmax value for the terminals being montitored by cathode 2 input 404, a value for a trigger threshold voltage (Vtrigger2) is determined for cathode 2 input 404. The value set for Vtrigger2 can be the Vmax (+56 volts in the example), or the Vmax plus a margin voltage. For this example, a margin voltage of +2 volts is used, and thus the Vtrigger2 voltage for the cathode 2 input 404 is set to a value of Vmax plus the margin voltage, or +58 volts.

When the voltage provided at cathode 2 input 404 is below the Vtrigger2 voltage level (and assuming no ESD events are occurring at the terminals being monitored by the cathode 1 input 402 for the purposes of this illustrative example), trigger circuit 410 is configured to provide an output signal at switched output 408 that causes semiconductor device 462 to be in an "OFF" state, resembling an open switch between nodes 411 and anode 406. When in the 'OFF" state, no current is flowing from the cathode 2 input 404 to anode 406 outside trigger circuit 410, and so the voltage being provided at any of the terminals being monitored by the cathode 2 input 404 of trigger circuit 410 are maintained at their respective voltage levels. If any of the terminals being monitored by cathode 2 input 404 experience an ESD event, the voltage provided at the cathode 2 input 404 will rise to a voltage level that exceeds the Vtrigger2 threshold voltage. Once the voltage level being provided at the cathode 2 input 404 exceeds the Vtrigger2 voltage level, trigger circuit 410 is configured to provide an output signal at switched output 408 that transitions semiconductor device 462 from an "OFF" state to an "ON" state. As previously described, when in the "ON" state, semiconductor device 462 operates in an operating region of the semiconductor device, allowing current to flow (illustrated by arrow $I_{ESD2}$,) through semiconductor device 462. The current flow from the cathode 2 input 404 flows through device 462 and on to anode 406. The current flow through semiconductor device 462 creates a voltage drop across semiconductor device 462, and thus pulls the voltage at node 411, and thus the voltage at the cathode 2 input 404, to a voltage level determined by the voltage provided at anode 406 plus the voltage drop across semiconductor device 462. By varying the output signal provided at the switched output 408, trigger circuit 410 is operable to regulate semiconductor device 462 to control the amount of current flowing through semiconductor device 462, and thus to control (clamp) the voltage level at node 411, and thus at the cathode 2 input 404 to some maximum clamped voltage level. In various examples, trigger circuit 410 is configured to control semiconductor device 462 so that the maximum clamped voltage level that can be reached at the cathode 2 input 404 during the ESD event is a voltage level just above the Vtrigger2 voltage level for the terminal being monitored by the cathode 2 input 404. In this manner, trigger circuit 410 is operable to clamp the voltage level that can be reached in an ESD event at any of the terminals being monitored by cathode 2 input 404, and thus provide ESD event protection for any functional circuitry that may be coupled to the terminals being monitored by cathode 2 input 404 that are also experiencing an ESD event.

Setting the Vtrigger2 voltage for the cathode 2 input 404 in some examples may be accomplished by adjusting the type(s) and number(s) of Zener diodes included in the second stack of Zener diodes 412 and taking into consideration the reverse-breakdown voltage already configured by the first stack of Zener diodes 420. As shown in FIG. 4, the second stack of Zener diodes 412 is coupled between node 411 and node 413. As described above, node 413 is coupled to anode 406 through resistor 414 and the first stack of Zener diodes 420. By coupling the second stack of Zener diodes 412 in series with resistor 414 and the first stack of Zener diodes 420, a total predetermined threshold voltage level value between node 411 and anode 406 can be configured based on the sum of the predetermined threshold voltage level for the first stack of Zener diodes 420 plus the predetermined threshold voltage level for the second stack of Zener diodes 412. By arranging the type(s) and number(s) of Zener diodes that are "stacked" (coupled in series) to form the second stack of Zener diodes 412, the reverse-breakdown voltage between terminal 412A and 412B can be configured, which, when added to the reverse-breakdown voltage for the first stack of Zener diodes 420, provides the total reverse-breakdown voltage, and thus set the Vtrigger2 threshold voltage level for the cathode 2 input 404.

Again using the +42 volts as an illustrative Vtrigger1 threshold voltage, the first stack of Zener diodes 420 is figured to provide a +42 volt reverse-breakdown voltage between node 413 and anode 406. In order to achieve the desired +56 volt reverse-breakdown voltage between node 411 and anode 406, the second stack of Zener diodes 412 is configured to provide a reverse-breakdown voltage from terminal 412A to 412B of +14 volts, which is the difference between the Vtrigger2 voltage of +56 volts and the +42 reverse-breakdown voltage already provided by the first stack of Zener diodes 420. Again using Zener diodes that individually have a reverse-breakdown voltage of 7 volts per diode, by coupling two such Zener diodes in series to form the second stack of Zener diodes 412 provides a total reverse-breakdown voltage of +14 volts (two diodes times 7 volts per diode). When the second stack of Zener diodes 412 having a reverse-breakdown voltage of +14 volts is coupled in series with the first stack of Zener diodes 420 having a reverse-breakdown voltage of +42 volts, trigger circuit 410 is configured to provide a total reverse-breakdown voltage between node 411 and anode 406 through the trigger circuit of +56 volts, that corresponds to the desired Vtrigger2 threshold voltage for the CATHODE 2 input 404. It would be understood by one of skill in the art that by using different type(s) and number(s) of diodes within the second stack of Zener diodes 412, trigger circuit 410 is configurable to provide one of many different possible threshold voltage level for the cathode 2 input 404 as long as the desired Vtrigger2 level is a voltage level that is higher than the Vtrigger1 threshold voltage level set by the first stack of Zener diodes. Further, adding the second stack of Zener diodes as illustrated in FIG. 4 and as described herein does not affect the setting of the threshold voltage for the cathode 1 input 402, and wherein the operations, features, and functions described herein related to the cathode 1 input 402 remain in place and are fully maintained with the addition of the cathode 2 input 404 and the second stack of Zener diodes 412.

Referring again to the cathode 2 input 404, when the voltage level provided at the cathode 2 input 404 is less than the Vtrigger2 voltage level, that voltage is also provided at node 411. However, because that voltage does not exceed the reverse-breakdown voltage provided by combination of the first stack of Zener diodes 420 and the second stack of Zener diodes 412, no current flows from node 411, through the second stack of Zener diodes 412 to node 413, and on through resistor 414 to node 415 to anode 406 through the first stack of Zener diodes 420. In the same manner described above, with no current flow through resistor 414, resistor 414 pulls the gate of transistor 418 up to the voltage provided at node 413, which, assuming no ESD events are occurring at cathode 1 input 402, provides no current flow through resistor 414. With no current flow through resistor 414, the voltage provided to the gate of transistor 418 causes transistor 418 to be turned off, and in a manner similar to that previously described, prevents a current flow through resistor 422, and thus generates no voltage drop (voltage differential) across resistor 422. Resistor 422 couples the switched output 408 to anode 406, and wherein as noted above, anode 406 is also coupled to the source of semiconductor device 462. With no current flowing through resistor 422, resistor 422 will pull the voltage level provided at switched output 408 to the voltage level provided at anode 406, which is the same voltage level being provided at the source of semiconductor device 462. When in this condition, the output signal provided at the switched output 408 turns semiconductor device to the "OFF" (and thus non-conducting) state, and no current (or only a negligible amount of current) will flow through semiconductor device 462 as described above for the "OFF" state with respect to semiconductor device 462. In this condition, no ESD induced current is redirected from the cathode 1 input 402, and semiconductor device is not controlling the voltage provided at the cathode 1 input 402.

When the voltage level provided at the cathode 2 input 404 is equal to or exceeds the Vtrigger2 threshold voltage level, that voltage level will initially be coupled to node 411. Because this voltage level provided at node 411 exceeds the reverse-breakdown voltage set for the combination of the first stack of Zener diodes 420 in combination with the second stack of Zener diodes 412, a flow of current will be established from the cathode terminal 412A through the second stack of Zener diodes 412 to node 413, through resistor 414, and through the first stack of Zener diodes 420 to anode 406. In a manner similar to that described above, the flow of current through resistor 414 generates a voltage drop (voltage differential) across resistor 414, which will also be applied between the gate and the source of transistor 418. The resistance value of resistor 414 is selected to that the voltage differential generated across resistor 414 by this initial current flow will bias transistor 418 to turn on and couple node 413 to node 417, and allow a flow of current from node 413 through transistor 418 to node 417 and resistor 422. The flow of current through resistor 422 generates a voltage drop (differential) across resistor 422. The voltage differential generated across resistor 422 relative to the voltage provided at anode 406 is provided at switched output 408, and thus to the gate of semiconductor device 462. The resistance value of resistor 422 is selected so that the voltage differential generated across resistor 422 by this initial current flow will provide an output signal at switched output 408 that will cause device 462 to switch from the "OFF" state to the "ON" state, and begin allowing current to flow from the cathode 2 input 404 to anode 406, in an amount sufficient so that the voltage drop generated across semiconductor device 462 clamps the voltage provided at the cathode 2 input 404 to a voltage level of approximately or just above the Vtrigger2 voltage level, and thus protects any functional circuitry coupled to the terminals being monitored and protected by the cathode 2 input 404.

As the voltage level provided at cathode 2 input 404 increases, the current flow through resistor 422 will also increase, generating a larger voltage drop (differential) across resistor 422, and thus increasing the bias voltage being provided as the output signal by the switched output 408. This increase in the biasing voltage being provided to semiconductor device 462 will cause device 462 to move to a different point in the operating region for device 462, lowering the effective resistance of device 462 and thus allowing more current to flow through device 462, by providing a lower effective resistance value between the source and the drain of device 462. This increase in current flow offsets the increase in the voltage level provided at cathode 2 input 404. If the voltage level at the cathode 2 input 404 decreases but still remains above the Vtrigger2 threshold voltage level, a smaller current flow will result through resistor 422, thus lower the voltage differential generated across resistor 422, and thus lowering the overall level being provided at the output signal to the gate of device 462 by the switched output 408. This lowering of the voltage level being provided as the output signal will, in some examples, cause semiconductor device 462 to move to a different point in the operating region of semiconductor device 462, raising the effective resistance of semiconductor device 462 and allowing less current to flow through semiconductor device 462.

When the voltage level provided at all of the terminals being monitored by the cathode 2 input 404 have returned to a voltage level that is below the trigger threshold voltage Vtrigger2 level set for the cathode 2 input 404, the voltage provided at node 411 will again be less than the reverse-breakdown voltage set for the combination of first stack of Zener diodes 420 and the second stack of Zener diodes 412. As such, the first stack of Zener diodes 420 (assuming there are no positive ESD events occurring on the terminals monitored by the cathode 1 input 402) and the second stack of Zener diodes 412 will stop conducting current from terminal 412A through the second stack of Zener diodes 412, resistor 414 and the first stack of Zener diodes 420 to anode 406, and thus current will no longer flow through resistor 414. With no current flowing through resistor 414, no voltage drop (voltage differential) will be generated across resistor 414, and thus the voltage provided at node 415 and at the gate of transistor 418 will return to the voltage provided at 413 and the source of transistor 418. When provided with the same voltage at the gate and at the source, transistor 418 will turn off, shutting off the flow of current from node 413 through resistor 422 to anode 406. Without a flow of current through resistor 422, the voltage provided as the output signal at the switched output 408 will be pulled down through resistor 422 to the voltage level provided at anode 406, which is the same voltage level being provided to the source of semiconductor device 462. When in this condition, semiconductor device will transition from the "ON" state to the "OFF" (non-conductive) state. In the "OFF" state, as described above no current (or only a negligible amount of current) will flow through semiconductor device 462, and thus will no longer control the voltage provided at the cathode 2 input 404. Under these conditions, the voltage provided at the cathode 2 input 404 will return to the highest voltage level provided by any of the terminals coupled to and being monitored by the cathode 1 input 402, and provided by any of the terminals coupled to and being monitored by the cathode 2 input 404.

As illustrated by and described with respect to FIG. 4, a separate (second) input to a trigger circuit has been added to the existing circuitry provided in the trigger circuit by the addition of only one additional stack of diodes in order to provide an input configured to monitor and protect a group of terminals having a different voltage class than the terminals monitored and protected by the first input to the trigger circuit, and while using a same single clamping semiconductor device. Thus, examples of the trigger circuit disclosed provide an efficient device and technique for providing a multiple-input trigger circuit for monitoring and providing ESD protection with a minimum of additional circuit components, thus using less circuit area, and a simple circuit with a simple to set threshold voltages for the additional inputs to the trigger circuit. As further disclosed herein, the trigger circuit 410 could be further modified to include a third, or more than three trigger inputs by simply adding additional stacks of diodes, wherein each stack of additional diodes be coupled in series to allow additional inputs at the nodes between each of the stacks of diodes at the top of the stack (coupled to the cathode input 404 in a cascaded fashion to provide any number of inputs having increasing larger and larger trigger threshold voltages for each input stacked in series and coupled to the switching circuit of resistor 414 and transistor 418.

In various examples with three or more trigger inputs, one or more further diodes like diode (Df) 426 may connect the trigger inputs to the drain of semiconductor device (big switch) 462. These one or more further diodes provide ESD current paths like diode (Df) 426 to the drain of semiconductor device (big switch) 462 from terminals connected to trigger inputs which are not shorted to the drain of semiconductor device (big switch) 462.

In examples described with respect to FIG. 4, trigger circuit 410 refers to the diodes within the stacks of diodes as Zener diodes. However, the type of diode or diodes used to form the stacks of diodes can be any type of diodes that can be used to block current flow through the stack of diodes up to a predetermined threshold voltage level, and then allow a current flow through the stack of diodes when a voltage level that exceeds the predetermined threshold voltage level is impressed across the stack of diodes. In some examples, the predetermined threshold voltage level is determined by the reverse-breakdown voltage level for one or more diodes.

Figure 5:
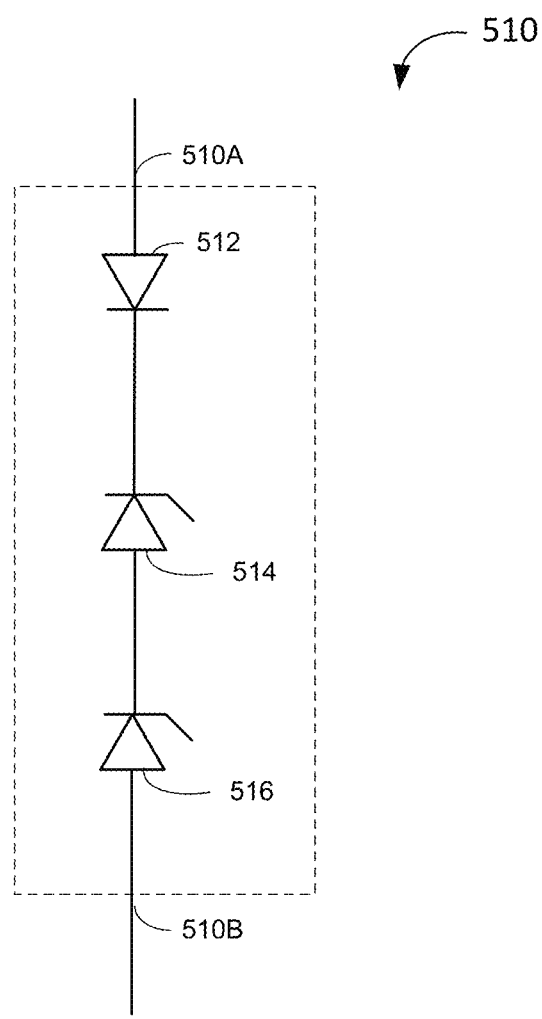
FIG. 5 illustrates an example stacked diode circuit for use in a trigger circuit in accordance with one or more example implementations and techniques described in this disclosure.

However, a stack of forward-biased diodes can also be utilized by configuring a stack of forward biased diodes so that a sum of the forward-bias voltages for the stack diodes creates a diode stack that only allows a current flow through the stack of diodes when the voltage level impressed across the stack of diodes exceeds the sum of the forward-biasing voltages. In some examples, diodes may be configured so that both forward-biased and reverse-bias diodes are included in the stack of diodes. FIG. 5 illustrates an example of a stack of diodes comprising both forward-biased and reverse-biased diodes.

In examples described with respect to FIG. 4, trigger circuit 410 refers to the diodes within the stacks of diodes as Zener diodes. However, the stack of diodes 412 and 420 of the trigger circuit 410 may contain other trigger devices like avalanche diodes, bipolar transistors, MOS transistors with gate/source short, MOS transistors with resistive coupling of gate and source, or thyristors (SCRs). In other examples, the predetermined threshold voltage level is determined by one or a combination of reverse-biased diodes, forward-biased diodes, bipolar transistors, MOS transistors and SCRs.

FIG. 5 illustrates an example stacked diode circuit 510 for use in a trigger circuit, for example as 412 or 420, in accordance with one or more example implementations and techniques described in this disclosure. Stacked diode circuit 510 includes a first terminal 510A, a forward-biased diode 512, two reverse-biased diodes 514 and 516, and a second terminal 510B. Forward-biased diode 512 and the two revere-biased diodes 514 and 516 are coupled in series between the first terminal 510A and the second terminal 510B as follows. Forward-biased diode 512 has an anode coupled to the first terminal 510A, and a cathode coupled to a cathode of reverse-biased diode 514. Reverse-biased diode 514 has an anode coupled to the cathode of reverse-biased diode 516, and reverse-biased diode 516 has an anode coupled to second terminal 510B of stacked diode circuit 510. The terms forward-biased and reverse biased in reference to diodes 512, 514, and 516 are based on the premise that a higher voltage level will be applied to first terminal 510A than is applied at second terminal 510B, and that stacked circuit 510 is intended to block current flow from first terminal 510A to second terminal 510B unless and until a voltage differential that exceed a threshold violate level set for the stack of diodes 510 is exceeded between the first terminal 510A and the second terminal 510B.

Using illustrative numbers of a forward-biasing voltage of 0.7 volts for diode 512, and a reverse breakdown voltage of 8 volts for each of Zener diodes 514 and 516, when coupled as shown in FIG. 5, a trigger threshold voltage of 0.7 volts plus two times 8 volts, for a total threshold voltage of 16.7 volts is configured for the stack of diodes 510. The stack of diodes 510 will block current flow from terminal 510A to terminal 510B through the stack of diodes 510 until and unless a voltage that exceeds 16.7 volts and is more positive at terminal 510A relative to terminal 510B is impressed across the stack of diodes 510. The stack of diodes 510 is just one example of many possible arrangements of diodes that could be configured to create a stack of diode having a predetermined threshold voltage, and that may be used in the examples of trigger circuits disclosed herein and the equivalents thereof.

Figure 6:
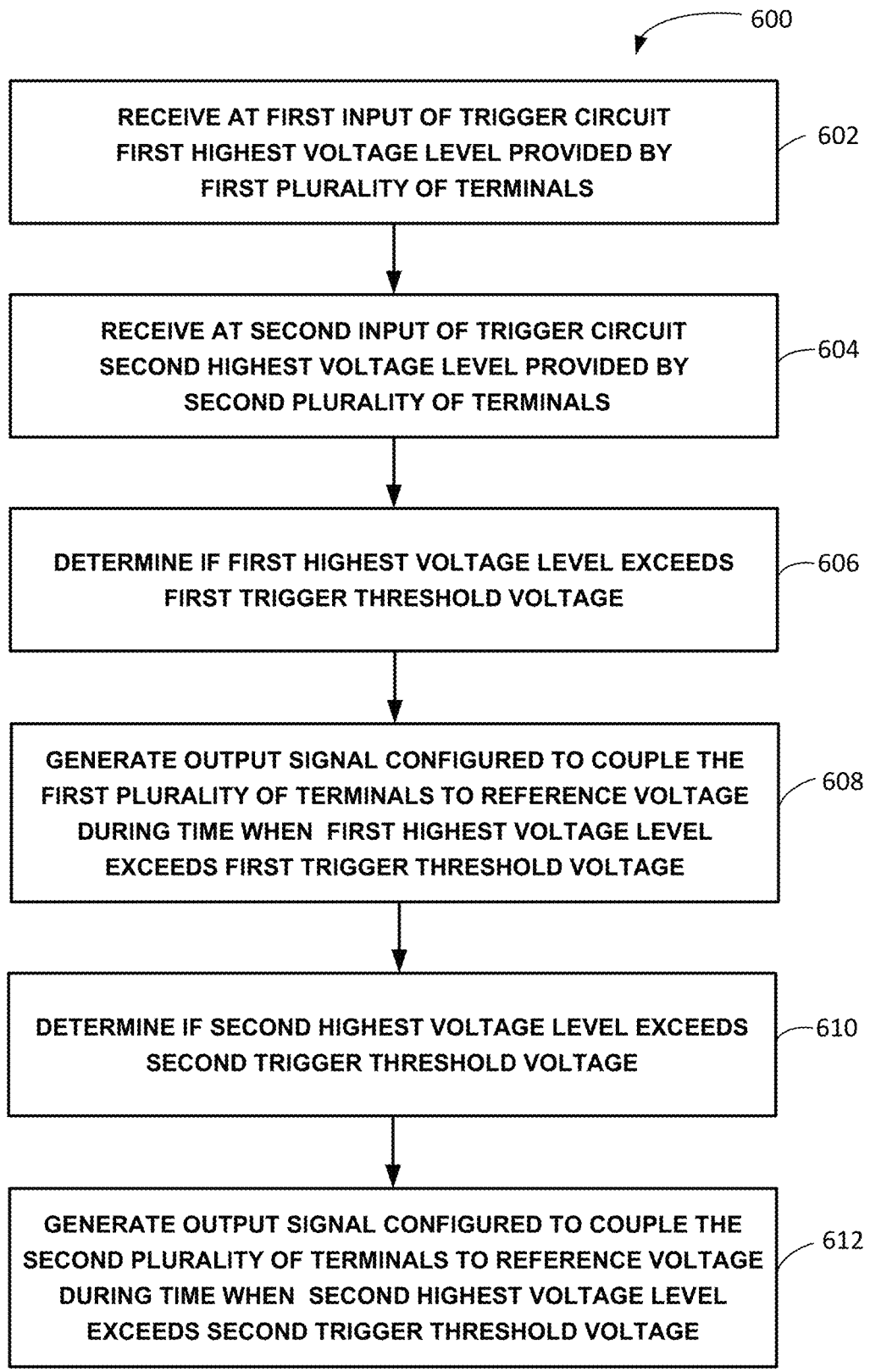
FIG. 6 illustrates a flowchart of one or more methods in accordance with one or more example implementations and techniques described in this disclosure.

FIG. 6 illustrates a flowchart of one or more methods 600 in accordance with one or more example implementations and techniques described in this disclosure. Although the methods 600 are described with respect to circuitry 140 and trigger circuit 350 as illustrated in FIG. 3, examples of the methods 600 illustrated in FIG. 6 are not limited to circuitry 140 or trigger circuit 350, and are operable to be performed using any of the example systems and devices described herein, or independently of these systems and devices. In various examples, trigger circuit 350 receives at a first input of a trigger circuit a first highest voltage level provided by a first group of terminals, the first group of terminals operating in a first voltage class (block 602). Trigger circuit also receives at a second input of the trigger circuit a second highest voltage level provided by a second group of terminals, the second group of terminals operating in a second voltage class that is different from the first voltage class (block 604). Trigger circuit 305 determines if the first highest voltage level exceeds a first trigger threshold voltage (block 606) and generates an output signal configured to turn on a semiconductor device to activate a path circuitry coupling the first group of terminals to a reference voltage to clamp the first highest voltage level relative to the reference voltage during a time when the first highest voltage level exceeds the first trigger threshold voltage (block 608).

In various examples, trigger circuit 350 determines if the second highest voltage level exceeds a second trigger threshold voltage (block 610), and generates the output signal configured to turn on the semiconductor device to activate the path circuitry coupling the second group of terminals to the reference voltage to clamp the second highest voltage level relative to the reference voltage during a time when the second highest voltage level exceeds the second trigger threshold voltage (block 612). In various examples of methods 600, at least one of the first group of terminals or the second group of terminal includes a plurality of terminals. Example methods include the setting of the first trigger threshold voltage for the first input of a trigger circuit 350 comprising configuring a first stack of diodes so that a reverse-breakdown voltage of the first stack of diodes is equal to the first trigger threshold voltage. Examples methods include setting the second trigger threshold voltage for the second input of a trigger circuit 350 comprising configuring a second stack of diodes so that a reverse-breakdown voltage of the second stack of diodes added to the reverse breakdown voltage for the first stack of diodes is equal to the second trigger threshold voltage.

Example methods include receiving at the first input of the trigger circuit 350 the first highest voltage level provided by the first group of terminals, further comprises having the first group of terminals comprise a first plurality of terminals, and receiving the highest voltage level from the first plurality of terminals through a forward biased diode coupled between the one of the first plurality of terminals that is providing the highest voltage level relative to any other terminals of the first plurality of terminals. Example methods include receiving at the second input of the trigger circuit the second highest voltage level provided by the second group of terminals, further comprises having the second group of terminals comprise a second plurality of terminals, and receiving the second highest voltage level from the second plurality of terminals through a forward-biased diode coupled between the one of the second plurality of terminals that is providing the second highest voltage level relative to any other terminals of the second plurality of terminals.

Example methods include having the first group of terminals comprise a first plurality of terminals, and wherein at least one of the terminals comprising the first plurality of terminals provides a varying voltage level at the at least one terminal representative of data, and that at least at some time period comprises a terminal voltage level that is less than another terminal voltage level being provided at the time period by another one of the terminals comprising the first plurality of terminal. Example methods include having the second group of terminals comprises least one terminal that at some time period or time periods provides a terminal voltage level that is less than the second highest voltage level being provided during the time period or time periods same time by the first group of terminals without triggering the first input or the second input of the trigger circuit.

In various examples, use of the word "coupled" or "coupling" refers to a direct coupling between lead or terminals of a device or electrical component by a conductor without intervening devices or electrical components, as would be understood by a person of ordinary skill in the art.

In various examples, use of the word "coupled" or "coupling" refers to electrical coupling of devices or electrical components that may include coupling through one or more intervening devices or other electrical components, as would be understood by one of ordinary skill in the art.

The following examples describe one or more aspects of the disclosure.

Example 1. A circuit comprising: a trigger circuit comprising a first input, a second input, an anode, and a switched output, wherein the anode is configured to be coupled to a reference voltage, wherein the first input is configured to monitor a highest voltage level provided at a first group of terminals, the first group of terminals configured to operate within a first voltage class, wherein the second input is configured to monitor a highest voltage level provided at a second group of terminals, the second group of terminals configured to operate within a second voltage class that is different from the first voltage class, wherein a second maximum operating voltage for the second group of terminals is different than a first maximum operating voltage for the first group of terminals and wherein at least one of the first group of terminals or the second group of terminal comprises a plurality of terminals, and wherein the trigger circuit is configured to provide an output signal at the switched output when a positive electrostatic (ESD) event is occurring at either the first group of terminals or at the second group of terminals; and a single electronic switching device coupled to the switched output, the electronic switching device configured to receive the output signal, and to switch on and to clamp a voltage level occurring at the first group of terminals and at the second group of terminals relative to the reference voltage.

Example 2. The circuit of example 1, wherein the first input is coupled to a switching circuit, and a first stack of diodes, the first stack of diodes configured to have a first predetermined threshold voltage set to a first trigger threshold voltage and configured to turn on the switching circuit when a voltage level received at the first input exceeds the first trigger threshold voltage, the switching circuit coupled to the switched output and configured to provide the on signal to the switched output when the switching circuit is turned on by the first stack of diodes.

Example 3. The circuit of either of examples 1 or 2, wherein the second input is coupled to a second stack of diodes, the second stack of diodes is coupled in series with the first stack of diodes, the second stack of diodes arranged to have a second predetermined threshold voltage across the second stack of diodes to set a second trigger threshold voltage comprising a sum of the first predetermined threshold voltage and the second predetermined threshold voltage, the second stack of diodes configured to turn on the switching circuit when a voltage level received at the second input exceeds the second trigger threshold voltage; and the switching circuit configured to provide the on signal to the switched output when the switching circuit is turned on by the second stack of diodes.

Example 4. The circuit of any of examples 1-3, wherein the second threshold voltage level is higher than the reference voltage provided at the anode and is higher than the first threshold voltage level.

Example 5. The circuit of any of examples 1-4, wherein a size of the single electronic switching device is approximately 14000 $\mu m^2$, and a size for any diodes in the first stack of diodes and the second stack of diodes is equal to or less than 500 $\mu m^2$.

Example 6. The circuit of any of examples 1-5, wherein the first input of the trigger circuit is configured to be coupled to each terminal of the first group of terminals through a first set of forward-biased diodes, each of the diodes of the first set of forward biased diodes having an anode coupled to one and only one terminal of the first group of terminals and a cathode coupled to the first input of the trigger circuit; and wherein the second input of the trigger circuit is configured to be coupled to each terminal of the second group of terminal through a second set of forward biased diodes, each of the diodes of the second set of forward biased diodes having an anode coupled to one and only one terminal of the second group of terminals and a cathode coupled to the second input of the trigger circuit.

Example 7. The circuit of any of examples 1-6, wherein the single electronic switching device is configured to, when switched on, provide a path circuitry to conduct current from the first group of terminals and from the second group of terminals through the semiconductor device to the reference voltage to redirect current away from one or more functional circuits coupled to either the first group of terminals or the second group of terminals.

Example 8. The circuit of any of examples 1-7 wherein the first group of terminals comprises a plurality of terminals having at least one of the plurality of terminals configured to provide a first supply voltage level that is higher than the reference voltage, and at least a second one of the plurality of terminals configured to operate at some times at an operating voltage level that is higher than the reference voltage and less than the first supply voltage level.

Example 9. The circuit of any of examples 1-8, wherein the second group of terminals comprises a plurality of terminals having at least one of the plurality of terminals configured to provide a second supply voltage level that is higher than the reference voltage and higher than a maximum operating voltage for the first voltage class, and at least a second one of the plurality of terminals configured to operate at some times at an operating voltage level that is higher than the reference voltage and less than the second supply voltage level.

Example 10. The circuit of any of examples 1-9, further comprising: a forward-biased diode (Df) having an anode coupled to the first input of the trigger circuit and a cathode coupled to the second input of the trigger circuit, the forward-biased diode (Df) configured to conduct current through the forward-biased diode (Df) from the first input to the second input and through the single electronic switching device when the single electronic switching device is switched on.

Example 11. A method of providing overvoltage protection for an electronic circuit comprising: receiving at a first input of a trigger circuit a first highest voltage level provided by a first group of terminals, the first group of terminals operating in a first voltage class; receiving at a second input of the trigger circuit a second highest voltage level provided by a second group of terminals, the second group of terminals operating in a second voltage class that is different from the first voltage class; determining if the first highest voltage level exceeds a first trigger threshold voltage, and generating an output signal configured to turn on a semiconductor device to activate a path circuitry coupling the first group of terminals to a reference voltage to clamp the first highest voltage level relative to the reference voltage during a time when the first highest voltage level exceeds the first trigger threshold voltage; and determining if the second highest voltage level exceeds a second trigger threshold voltage, and generating the output signal configured to turn on the semiconductor device to activate the path circuitry coupling the second group of terminals to the reference voltage to clamp the second highest voltage level relative to the reference voltage during a time when the second highest voltage level exceeds the second trigger threshold voltage; wherein at least one of the first group of terminals or the second group of terminal includes a plurality of terminals.

Example 12. The method of example 11, further comprising: setting the first trigger threshold voltage for the first input of a trigger circuit comprising configuring a first stack of diodes so that a predetermined threshold voltage of the first stack of diodes is equal to the first trigger threshold voltage.

Example 13. The method of example 12, further comprising: setting the second trigger threshold voltage for the second input of a trigger circuit comprising configuring a second stack of diodes so that a predetermined threshold voltage of the second stack of diodes added to the predetermined threshold voltage for the first stack of diodes is equal to the second trigger threshold voltage.

Example 14. The method of any of examples 11-13, wherein receiving at the first input of the trigger circuit the first highest voltage level provided by the first group of terminals, further comprises having the first group of terminals comprise a first plurality of terminals, and receiving the highest voltage level from the first plurality of terminals through a forward biased diode coupled between the one of the first plurality of terminals that is providing the highest voltage level relative to any other terminals of the first plurality of terminals and the first input of the trigger circuit.

Example 15. The method of any of examples 11-14, wherein receiving at the second input of the trigger circuit the second highest voltage level provided by the second group of terminals, further comprises having the second group of terminals comprise a second plurality of terminals, and receiving the second highest voltage level from the second plurality of terminals through a forward-biased diode coupled between the one of the second plurality of terminals that is providing the second highest voltage level relative to any other terminals of the second plurality of terminals and the second input of the trigger circuit.

Example 16. The method of any of examples 11-15, wherein the first group of terminals comprises a first plurality of terminals, and wherein at least one of the terminals provides a varying voltage level representative of data, and that at least at some time period comprises a terminal voltage level that is less than another terminal voltage level being provided at the time period by another one of the terminals comprising the first plurality of terminals.

Example 17. The method of any of examples 11-16, wherein the second group of terminals comprises at least one terminal that at some time period or time periods provides a terminal voltage level that is less than the second highest voltage level being provided during the time period or time periods by the second group of terminals without triggering the first input or the second input of the trigger circuit.

Example 18. The method of any of examples 11-17, wherein generating the output signal configured to turn on the semiconductor device to activate the path circuitry coupling the first group of terminals to the reference voltage further comprises: coupling each of the terminals in the first group of terminals to the single electronic switching device through a forward-biased diode (Df) so that the forward-biased diode (Df) redirects current from the first set of terminals through the forward-biased diode and through the single electronic switching device when the single electronic switching devise is turned on.

Example 19. A system comprising: an electronic device comprising a first group of terminals and a second group of terminals, the first group of terminals configured to operate within a first voltage class, the second group of terminals configured to operate within a second voltage class having a different operating voltage range than an operating voltage range of the first voltage class; functional circuitry coupled to the first group of terminals and to the second group of terminals; a trigger circuit comprising a first input coupled to each terminal in the first group of terminals, each terminal in the first group of terminals coupled separately to the first input through a different forward biased diode, and a second input coupled to each terminal in the second group of terminals, each terminal in the second group of terminals coupled separately to the second input through another different forward biased diode; wherein the trigger circuit comprises a switched output and is configured to monitor a first voltage level at the first input and to provide an output signal at the switch output when the first voltage exceeds a first threshold trigger voltage, and to monitor the second voltage level at the second input and to provide an output signal at the switched output when the second voltage exceeds a second threshold trigger voltage; and a semiconductor device coupled to the first group of terminals, to the second group of terminals, and to the switched output, the semiconductor device configured to receive the output signal from the trigger circuit and to turn on when receiving the output signal to clamp a voltage level at the first group of terminal and at the second group of terminals and to provide path circuitry through the semiconductor device to redirect current away from the functional circuitry.

Example 20. The system of example 19, wherein the trigger circuit comprises a first stack of diodes having a first predetermined threshold voltage, and a second stack of diodes having a second predetermined threshold voltage and couple in series with the first stack of diodes, wherein the first predetermined threshold voltage is equal to the first threshold trigger voltage, and wherein sum of the first predetermined threshold voltage and the second predetermined threshold voltage is equal to the second threshold trigger voltage.

Example 21. The system of either of examples 19 or 20, wherein at least one terminal in the first group of terminals is configured to be coupled to a voltage supply operable to supply a constant voltage level to the at least one terminal, and a second terminal of the first group of terminals configured to operate at least at some time at an operating voltage level that is less than the constant voltage level.

Example 22. The system of any of examples 19-21, further comprising a set of forward-biased diodes, each diode of the set of forward-biased diodes having an anode coupled to a reference voltage and a cathode coupled to a single terminal of either the first group of terminals or the second group of terminals, each of the forward-biased diodes configured to conduct current from the reference voltage to the single terminal coupled to the forward-biased diode when a negative electrostatic stress is occurring at single terminal to provide path circuitry through the diode without triggering the trigger circuit to turn on the semiconductor device.

Various examples of techniques and circuits have been described. These and other examples are within the scope of the following claims.

What is claimed is:

1. A circuit comprising:
    a trigger circuit comprising a first input, a second input, an anode, a switched output, and a transistor,
        wherein the anode is configured to be coupled to a reference voltage,
        wherein the first input is configured to monitor a first highest voltage level provided at a first group of terminals, the first group of terminals configured to operate within a first voltage class,
        wherein the second input is configured to monitor a second highest voltage level provided at a second group of terminals, the second group of terminals configured to operate within a second voltage class that is different from the first voltage class,
        wherein a second maximum operating voltage for the second group of terminals is different than a first maximum operating voltage for the first group of terminals and wherein at least one of the first group of terminals or the second group of terminal comprises a plurality of terminals, and
        wherein the transistor is configured to provide an output signal at the switched output when the first highest voltage level exceeds a first trigger threshold voltage and when the second highest voltage level exceeds a second trigger threshold voltage;
    a single electronic switching device comprising a first node coupled to the switched output, a second node directly coupled to the second input, and a third node directly coupled to the anode, the electronic switching device configured to receive the output signal, and to switch on and to clamp a voltage level occurring at the first group of terminals and at the second group of terminals relative to the reference voltage; and
    a forward-biased diode having an anode coupled to the first input of the trigger circuit and a cathode coupled to the second input of the trigger circuit, the forward-biased diode configured to conduct current through the forward-biased diode from the first input to the second input and through the single electronic switching device when the single electronic switching device is switched on.

2. The circuit of claim 1, wherein the first input is coupled to the transistor, and a first stack of diodes, the first stack of diodes configured to have a first predetermined threshold voltage level set to the first trigger threshold voltage and configured to turn on the transistor when a voltage level received at the first input exceeds the first trigger threshold voltage.

3. The circuit of claim 2, wherein the second input is coupled to a second stack of diodes, the second stack of diodes is coupled in series with the first stack of diodes, the second stack of diodes arranged to have a second predetermined threshold voltage level across the second stack of diodes to set the second trigger threshold voltage comprising a sum of the first predetermined threshold voltage level and the second predetermined threshold voltage level voltage, the second stack of diodes configured to turn on the transistor when a voltage level received at the second input exceeds the second trigger threshold voltage.

4. The circuit of claim 3, wherein the second threshold voltage level is higher than the reference voltage provided at the anode and is higher than the first threshold voltage level.

5. The circuit of claim 3, wherein a size of the single electronic switching device is 14000 $\mu m^2$, and a size for any diodes in the first stack of diodes and the second stack of diodes is equal to or less than 500 $\mu m^2$.

6. The circuit of claim 1, wherein the first input of the trigger circuit is configured to be coupled to each terminal of the first group of terminals through a first set of forward-biased diodes, each of the diodes of the first set of forward biased diodes having an anode coupled to one and only one terminal of the first group of terminals and a cathode coupled to the first input of the trigger circuit; and
    wherein the second input of the trigger circuit is configured to be coupled to each terminal of the second group of terminal through a second set of forward biased diodes, each of the diodes of the second set of forward biased diodes having an anode coupled to one and only one terminal of the second group of terminals and a cathode coupled to the second input of the trigger circuit.

7. The circuit of claim 1, wherein the single electronic switching device is configured to, when switched on, provide a path circuitry to conduct current from the first group of terminals and from the second group of terminals through the semiconductor device to the reference voltage to redirect current away from one or more functional circuits coupled to either the first group of terminals or the second group of terminals.

8. The circuit of claim 1, wherein the first group of terminals comprises a plurality of terminals having at least one of the plurality of terminals configured to provide a first supply voltage level that is higher than the reference voltage, and at least a second one of the plurality of terminals configured to operate at some times at an operating voltage level that is higher than the reference voltage and less than the first supply voltage level.

9. The circuit of claim 1, wherein the second group of terminals comprises a plurality of terminals having at least one of the plurality of terminals configured to provide a second supply voltage level that is higher than the reference voltage and higher than a maximum operating voltage for the first voltage class, and at least a second one of the plurality of terminals configured to operate at some times at an operating voltage level that is higher than the reference voltage and less than the second supply voltage level.

10. A method of providing overvoltage protection for an electronic circuit comprising:
    receiving at a first input of a trigger circuit a first highest voltage level provided by a first group of terminals, the first group of terminals operating in a first voltage class such that a transistor is switched on when a voltage at the first input is equal to or exceeds the first voltage class;
    receiving at a second input of the trigger circuit a second highest voltage level provided by a second group of terminals, the second group of terminals operating in a second voltage class that is different from the first voltage class such that the transistor is switched on when a voltage at the second input is equal to or exceeds the second voltage class;
    determining, with the transistor, if the first highest voltage level exceeds a first trigger threshold voltage, and generating an output signal configured to turn on a semiconductor device to activate a path circuitry coupling the first group of terminals to an anode to clamp the first highest voltage level relative to a reference voltage at the anode during a time when the first highest voltage level exceeds the first trigger threshold voltage, wherein the semiconductor device comprises a first node configured to receive the output signal, a second node directly coupled to the second input, and a third node directly coupled to the anode; and determining, with the transistor, if the second highest voltage level exceeds a second trigger threshold voltage, and generating the output signal configured to turn on the semiconductor device to activate the path circuitry coupling the second group of terminals to the anode to clamp the second highest voltage level relative to the reference voltage during a time when the second highest voltage level exceeds the second trigger threshold voltage;

wherein at least one of the first group of terminals or the second group of terminal includes a plurality of terminals, and wherein an anode of a forward-biased diode is coupled to the first input of the trigger circuit, wherein a cathode of the forward-biased diode is coupled to the second input of the trigger circuit, and wherein the forward-biased diode is configured to conduct current through the forward-biased diode from the first input to the second input and through the semiconductor device when the semiconductor device is switched on.

11. The method of claim 10, further comprising:
setting the first trigger threshold voltage for the first input of a trigger circuit comprising configuring a first stack of diodes so that a predetermined threshold voltage level of the first stack of diodes is equal to the first trigger threshold voltage.

12. The method of claim 11, further comprising:
setting the second trigger threshold voltage for the second input of a trigger circuit comprising configuring a second stack of diodes so that a predetermined threshold voltage level of the second stack of diodes added to the predetermined threshold voltage level for the first stack of diodes is equal to the second trigger threshold voltage.

13. The method of claim 10, wherein receiving at the first input of the trigger circuit the first highest voltage level provided by the first group of terminals, further comprises having the first group of terminals comprise a first plurality of terminals, and receiving the highest voltage level from the first plurality of terminals through a forward biased diode coupled between the one of the first plurality of terminals that is providing the highest voltage level relative to any other terminals of the first plurality of terminals and the first input of the trigger circuit.

14. The method of claim 10, wherein receiving at the second input of the trigger circuit the second highest voltage level provided by the second group of terminals, further comprises having the second group of terminals comprise a second plurality of terminals, and receiving the second highest voltage level from the second plurality of terminals through a forward-biased diode coupled between the one of the second plurality of terminals that is providing the second highest voltage level relative to any other terminals of the second plurality of terminals and the second input of the trigger circuit.

15. The method of claim 10, wherein the first group of terminals comprises a first plurality of terminals, and wherein at least one of the terminals provides a varying voltage level representative of data, and that at least at some time period comprises a terminal voltage level that is less than another terminal voltage level being provided at the time period by another one of the terminals comprising the first plurality of terminals.

16. The method of claim 10, wherein the second group of terminals comprises at least one terminal that at some time period or time periods provides a terminal voltage level that is less than the second highest voltage level being provided during the time period or time periods by the second group of terminals without triggering the first input or the second input of the trigger circuit.

17. A system comprising:
an electronic device comprising a first group of terminals and a second group of terminals, the first group of terminals configured to operate within a first voltage class, the second group of terminals configured to operate within a second voltage class having a different operating voltage range than an operating voltage range of the first voltage class;

functional circuitry coupled to the first group of terminals and to the second group of terminals;

a trigger circuit comprising a transistor, a first input coupled to each terminal in the first group of terminals, each terminal in the first group of terminals coupled separately to the first input through a different forward biased diode, a second input coupled to each terminal in the second group of terminals, each terminal in the second group of terminals coupled separately to the second input through another different forward biased diode, and an anode, wherein the trigger circuit comprises a switched output and is configured to monitor a first voltage level at the first input and to provide, with the transistor, an output signal at the switched output when the first voltage exceeds a first threshold trigger voltage, and to monitor the second voltage level at the second input and to provide, with the transistor, an output signal at the switched output when the second voltage exceeds a second threshold trigger voltage;

a semiconductor device comprising a first node coupled to the switched output, a second node directly coupled to the second input, and a third node directly coupled to the anode, the semiconductor device configured to receive the output signal from the trigger circuit and to turn on when receiving the output signal to clamp a voltage level at the first group of terminal and at the second group of terminals and to provide path circuitry through the semiconductor device to redirect current away from the functional circuitry and to the anode; and a forward-biased diode having an anode coupled to the first input of the trigger circuit and a cathode coupled to the second input of the trigger circuit, the forward-biased diode configured to conduct current through the forward-biased diode from the first input to the second input and through the semiconductor device when the semiconductor device is switched on.

18. The system of claim 17, wherein the trigger circuit comprises a first stack of diodes having a first predetermined threshold voltage level, and a second stack of diodes having a second predetermined threshold voltage level and coupled in series with the first stack of diodes, wherein the first predetermined threshold voltage level is equal to the first threshold trigger voltage, and wherein sum of the first predetermined threshold voltage level and the second predetermined threshold voltage level is equal to the second threshold trigger voltage.

19. The system of claim 17, wherein at least one terminal in the first group of terminals is configured to be coupled to a voltage supply operable to supply a constant voltage level to the at least one terminal, and a second terminal of the first group of terminals configured to operate at least at some time at an operating voltage level that is less than the constant voltage level.

20. The system of claim 17, further comprising a set of forward-biased diodes, each diode of the set of forward-biased diodes having an anode coupled to a reference voltage and a cathode coupled to a single terminal of either the first group of terminals or the second group of terminals, each of the forward-biased diodes configured to conduct current from the reference voltage to the single terminal coupled to the forward-biased diode when a negative electrostatic stress is occurring at single terminal to provide path circuitry through the diode without triggering the trigger circuit to turn on the semiconductor device.

* * * * *